(12) United States Patent
Kirihara et al.

(10) Patent No.: US 9,701,026 B2
(45) Date of Patent: Jul. 11, 2017

(54) ROBOT ARM AND ROBOT

(71) Applicant: Seiko Epson Corporation, Tokyo (JP)

(72) Inventors: Daisuke Kirihara, Chino (JP); Kazuto Yoshimura, Matsumoto (JP)

(73) Assignee: Seiko Epson Corporation (JP)

( * ) Notice: Subject to any disclaimer, the term of this patent is extended or adjusted under 35 U.S.C. 154(b) by 86 days.

(21) Appl. No.: 14/480,981

(22) Filed: Sep. 9, 2014

(65) Prior Publication Data

US 2015/0068347 A1  Mar. 12, 2015

(30) Foreign Application Priority Data

Sep. 10, 2013 (JP) ................. 2013-187149
Sep. 13, 2013 (JP) ................. 2013-191011
Sep. 13, 2013 (JP) ................. 2013-191012
Sep. 13, 2013 (JP) ................. 2013-191013
Oct. 31, 2013 (JP) ................. 2013-226523

(51) Int. Cl.

| B25J 17/02 | (2006.01) |
|---|---|
| B25J 9/06 | (2006.01) |
| B25J 19/00 | (2006.01) |
| B25J 18/00 | (2006.01) |

(52) U.S. Cl.
CPC ............... B25J 17/02 (2013.01); B25J 9/06 (2013.01); B25J 19/0025 (2013.01); *B25J 18/005* (2013.01); *Y10S 901/15* (2013.01); *Y10S 901/28* (2013.01); *Y10S 901/29* (2013.01); *Y10T 29/49963* (2015.01); *Y10T 74/20311* (2015.01); *Y10T 74/20317* (2015.01); *Y10T 74/20329* (2015.01)

(58) Field of Classification Search
CPC ............. B25J 17/02; B25J 18/005; B25J 9/06
USPC .................... 74/490.05, 490.01, 490.06
See application file for complete search history.

(56) References Cited

U.S. PATENT DOCUMENTS

| 3,419,158 A | 12/1968 | Lemelson |
| 3,610,438 A | 10/1971 | Opdahl |
| 3,985,238 A | 10/1976 | Nakura et al. |
| 4,507,046 A | 3/1985 | Sugimoto et al. |
| 5,207,114 A | 5/1993 | Salisbury, Jr. et al. |
| 5,327,790 A | 7/1994 | Levin et al. |

(Continued)

FOREIGN PATENT DOCUMENTS

| DE | 3034912 A1 * 4/1981 ............ B25J 9/046 |
| DE | 3022162 A1 * 12/1981 ............ B25J 9/14 |

(Continued)

*Primary Examiner* — William Kelleher
*Assistant Examiner* — Randell J Krug
(74) *Attorney, Agent, or Firm* — Harness, Dickey & Pierce, P.L.C.

(57) ABSTRACT

A robot arm increases a plurality of arm sections that are turnably connected. The arm sections include a plurality of links and an actuator section that turns the plurality of links. The actuator section includes: a cylindrical cover provided on an outer surface; a motor that turns the plurality of links; a motor frame included in the motor; a reduction gear that decelerates rotation from the motor and outputs a torque; a collar fixed to the reduction gear; and a wire body including at least one of a wire and a pipe. At least a part of the wire body is housed between a surface including a first small body section formed by the motor frame and the collar and a surface including a second small body section of the cylindrical cover.

5 Claims, 26 Drawing Sheets

(56) References Cited

U.S. PATENT DOCUMENTS

| | | |
|---|---|---|
| 5,669,269 A | 9/1997 | Katamine et al. |
| 5,806,169 A | 9/1998 | Trago et al. |
| 6,153,828 A | 11/2000 | Murata et al. |
| 6,753,628 B1 | 6/2004 | Neal |
| 6,844,636 B2 | 1/2005 | Lieu et al. |
| 7,154,200 B2 | 12/2006 | Neal |
| 7,230,402 B2 | 6/2007 | Kumagai et al. |
| 7,253,578 B2 | 8/2007 | Kumagai et al. |
| 7,299,713 B2 | 11/2007 | Uematsu et al. |
| 7,347,120 B2 | 3/2008 | Friedrich et al. |
| 7,673,536 B2 | 3/2010 | Tamura et al. |
| 8,266,979 B2 | 9/2012 | Yonehara et al. |
| 8,525,460 B2 * | 9/2013 | Reiland .......... G05B 15/00 267/277 |
| 8,540,748 B2 | 9/2013 | Murphy et al. |
| 8,584,547 B2 * | 11/2013 | Sirkett .......... B25J 19/0091 403/223 |
| 8,701,513 B2 | 4/2014 | Rosengren et al. |
| 8,720,296 B2 | 5/2014 | Yonehara et al. |
| 8,763,489 B2 | 7/2014 | Kirihara et al. |
| 8,839,689 B2 * | 9/2014 | Long .......... B25J 17/0258 74/490.05 |
| 8,863,607 B2 | 10/2014 | Kume |
| 2004/0149064 A1 | 8/2004 | Narita et al. |
| 2005/0193854 A1 | 9/2005 | Sanemasa |
| 2006/0182595 A1 | 8/2006 | Lundstrom et al. |
| 2009/0114052 A1 | 5/2009 | Haniya et al. |
| 2010/0313694 A1 | 12/2010 | Aoki |
| 2011/0000737 A1 | 1/2011 | Nagase et al. |
| 2011/0052432 A1 | 3/2011 | Cunningham et al. |
| 2011/0107866 A1 | 5/2011 | Oka et al. |
| 2011/0174108 A1 | 7/2011 | Graham et al. |
| 2011/0190934 A1 | 8/2011 | Reiland et al. |
| 2011/0252913 A1 | 10/2011 | Ibayashi et al. |
| 2012/0039729 A1 | 2/2012 | Horng et al. |
| 2012/0176007 A1 * | 7/2012 | Takeuchi .......... H02K 7/116 310/68 B |
| 2012/0279343 A1 | 11/2012 | Ihrke et al. |
| 2012/0286629 A1 | 11/2012 | Johnson et al. |
| 2013/0152722 A1 | 6/2013 | Kumagai et al. |
| 2013/0334906 A1 | 12/2013 | Sonoda et al. |
| 2013/0340560 A1 | 12/2013 | Burridge et al. |
| 2014/0021808 A1 | 1/2014 | Palfenier et al. |
| 2014/0076089 A1 * | 3/2014 | Long .......... B25J 9/102 74/490.06 |
| 2014/0102240 A1 | 4/2014 | Inada et al. |
| 2014/0137691 A1 | 5/2014 | Nogami et al. |
| 2014/0150592 A1 | 6/2014 | Kremerman |
| 2015/0122073 A1 * | 5/2015 | Maisonnier .......... B25J 9/0006 74/490.05 |
| 2015/0156927 A1 | 6/2015 | Tsuboi |
| 2015/0367509 A1 * | 12/2015 | Georgeson .......... B64F 5/0045 700/258 |

FOREIGN PATENT DOCUMENTS

| | | | |
|---|---|---|---|
| GB | WO 2006136827 A1 * | 12/2006 | .......... B25J 9/06 |
| JP | 60-024888 | 2/1985 | |
| JP | EP 0136719 A2 * | 4/1985 | .......... B25J 9/06 |
| JP | 60-167796 A | 8/1985 | |
| JP | 60-153792 | 10/1985 | |
| JP | 61-001234 A | 1/1986 | |
| JP | 61-061194 | 4/1986 | |
| JP | 62-241689 | 10/1987 | |
| JP | 01-131494 A | 5/1989 | |
| JP | 04-315592 B2 | 11/1992 | |
| JP | 05-237789 A | 9/1993 | |
| JP | 05-253171 A | 10/1993 | |
| JP | 09-141593 | 6/1997 | |
| JP | 09-285980 | 11/1997 | |
| JP | 11-104987 A | 4/1999 | |
| JP | 11-216698 | 8/1999 | |
| JP | 2000-006065 A | 1/2000 | |
| JP | 2006-159302 A | 6/2006 | |
| JP | 2006-187841 A | 7/2006 | |
| JP | 2007-144559 A | 6/2007 | |
| JP | 2010-161891 A | 7/2010 | |
| JP | 2010-167515 A | 8/2010 | |
| JP | 2010-284777 A | 12/2010 | |
| JP | 2011-177010 A | 9/2011 | |
| JP | 2012-147579 A | 8/2012 | |
| WO | WO-2004-078423 A1 | 9/2004 | |

\* cited by examiner

ROBOT ARM AND ROBOT

CROSS-REFERENCE TO RELATED APPLICATIONS

This application claims priority to Japanese Patent Application Nos. 2013-187149 filed Sep. 10, 2013; 2013-191011 filed Sep. 13, 2013; 2013-191012 filed Sep. 13, 2013; 2013-191013 filed Sep. 13, 2013; and 2013-226523 filed Oct. 31, 2013; all of which are hereby expressly incorporated by reference herein in their entirety.

BACKGROUND

1. Technical Field

The present invention relates to a robot arm and a robot.

2. Related Art

A multi-joint robot arm in which a plurality of arm members (elements) are connected one another has been known. JP publication No. 2010-284777 discloses a multi-joint robot arm that has housing (a motor case) in which a motor is mounted. A cable is wound around an outer circumference of the housing. An outer diameter of the housing is substantially the same in a center axis direction.

However, in the multi-joint robot arm disclosed in JP publication No. 2010-284777, because the outer diameter of the housing is substantially the same in the center axis direction, a length of the cable that is wound around the housing is proportionally longer as the outer diameter and the number of wound are larger. Thus, the following problems occur: the costs of a cable may increase and work hours for cabling increase. Thus, one of objects of the present invention is to provide a robot arm and a robot in which a length of a cable is as short as possible.

JP publication No. H09-141593 also discloses a multi-joint robot arm that has housing (a motor case) in which a motor is mounted. Heat that is generated by an operation of the motor is transferred via the housing.

However, in the multi-joint robot arm disclosed in JP publication No. H09-141593, because a thickness of a wall of the housing is substantially the same in a center axis direction, it is hard to intentionally design about a motor heat transfer preferential path, i.e., the heat transfer preferential path is toward an end effector side or a base side. Thus, one of objects of the present invention is to provide a robot arm and a robot in which heat generated by a motor is surely transferred to the base side.

A robot arm configured by coupling a plurality of arm sections and a robot including the robot arm have been known (see, for example, Patent Literature 1). In the robot arm, a coupling portion of the arm sections is a joint. The arm sections can be bent or twisted by the joint. The external shape of each of the arm sections is formed in a pillar shape (e.g., a columnar shape). The outer diameter of the arm section is substantially fixed along the center axis direction thereof.

The related art is described in JP-A-2010-284777.

However, when the arm sections having the substantially fixed outer diameter are bent by the joint between the arm sections, since the outer diameter is fixed, the outer circumferential section of one arm section and the outer circumferential section of the other arm section interfere with each other (collide with each other) relatively early after the start of the bending. Therefore, a movable range (a turning range) of the arms is relatively narrow.

SUMMARY

An advantage of some aspects of the invention is to provide a robot arm in which, when one arm section of two arm sections coupled to each other turns with respect to the other arm section, a turning range of the arm section can be secured as wide as possible and a robot including the robot arm.

The advantage is attained by application examples according to the invention explained below.

Application Example 1

This application example is directed to a robot arm in which a plurality of arm sections including a first arm section and a second arm section are turnably connected. The arm section includes a first link, a second link, and an actuator section that turns the first link and the second link. The first arm section includes, on an outer circumferential surface between the first link and the second link in a center axis direction, a small body section with reduced length of a body circumference.

With this configuration, when one arm section of the two arm sections coupled to each other turns with respect to the other arm section, the one arm section can turn until a part of an outer circumferential section of the other arm enters the small body section of the one arm section. Therefore, it is possible to secure a turning range of the one arm section as wide as possible. A body shape including the small body section is exemplified by a hand drum or a sandglass.

Application Example 2

In the robot arm according to the application example described above, it is preferable that the small body section is located on the extension of a track on which the second arm section turns and a part of the second arm section approaches the first arm section.

With this configuration, when the one arm section of the two arm sections coupled to each other turns with respect to the other arm section, the one arm section can turn until a part of the outer circumferential section of the other arm section enters the small body section of the one arm section. Therefore, it is possible to secure a turning range of the one arm section as wide as possible.

Application Example 3

In the robot arm according to the application example described above, it is preferable that the length of the body circumference gradually changes in the small body section.

With this configuration, when a part of the second arm section turns in a direction toward the first arm section, since the length of the body circumference gradually changes, the second arm section can smoothly turn while securing a turning range as wide as possible.

Application Example 4

In the robot arm according to the application example described above, it is preferable that, in the small body section, a curvature of the first arm section on a side adjacent to the second arm section is larger than a curvature on the opposite side of the second arm section.

The configuration described above contributes to securing a turning range of the second arm section as wide as possible.

Application Example 5

In the robot arm according to the application example described above, it is preferable that the second arm section coupled to the first arm section including the small body section includes a small diameter end section where the outer diameter of the outer circumferential surface at an end adjacent to the first arm section is reduced.

The configuration described above contributes to securing a turning range of the one arm section as wide as possible.

Application Example 6

In the robot arm according to the application example described above, it is preferable that the outer diameter of the small diameter end section decreases according to a distance from the first arm section.

The configuration described above contributes to securing a turning range of the one arm section as wide as possible. The outer diameter of the small diameter end section becomes smaller toward the first arm section.

Application Example 7

This application example is directed to a robot including the robot arm in the application example described above.

With this configuration, when one arm section of the two arm sections coupled to each other turns with respect to the other arm section, the one arm section can turn until a part of an outer circumferential section of the other arm section enters the small body section of the one arm section. Therefore, it is possible to secure a turning range of the one arm section as wide as possible.

BRIEF DESCRIPTION OF THE DRAWINGS

The invention will be described with reference to the accompanying drawings, wherein like numbers reference like elements.

FIGS. 3A and 3B are diagrams showing turning states of robot arms, wherein FIG. 3A is a turning state of the robot arm shown in FIG. 1 and FIG. 3B shows a turning state of a robot arm in the past.

FIGS. 5A and 5B are perspective views showing twisted states of the robot arm shown in FIG. 1, wherein FIG. 5A shows a state before twisting and FIG. 5B shows a state after the twisting.

FIGS. 6A to 6C are schematic side views and schematic views from a proximal end side showing twisted states of the robot arm shown in FIG. 1, wherein FIG. 6A shows a state before twisting, FIG. 6B shows a state during the twisting, and FIG. 6C shows a state after the twisting.

DESCRIPTION OF EXEMPLARY EMBODIMENTS

A robot arm and a robot according to the invention are explained in detail below on the basis of preferred embodiments shown in the accompanying drawings.

First Embodiment 1

Figure 1:
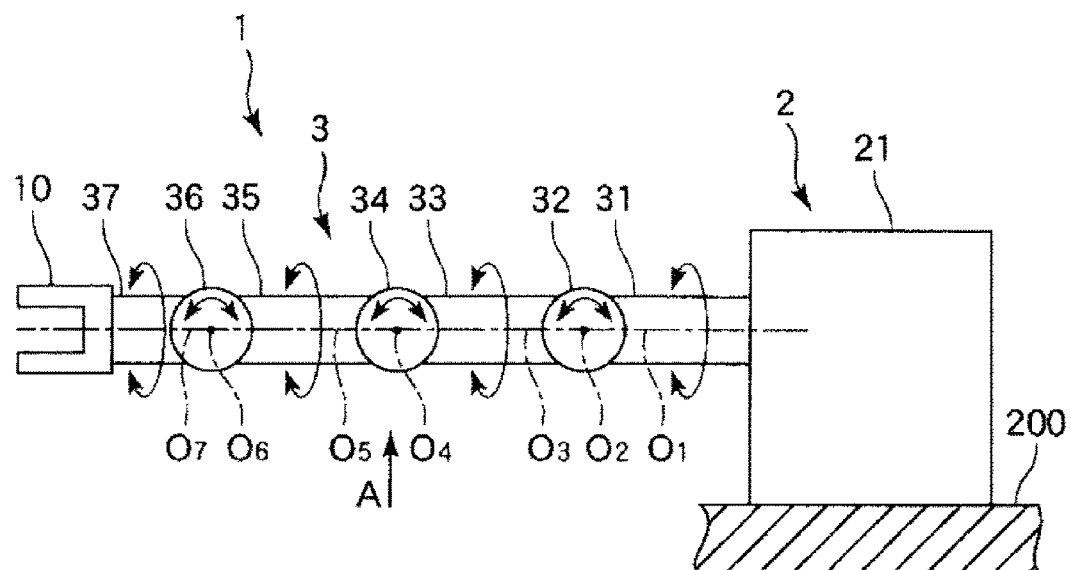
FIG. 1 is a schematic front view showing a robot including a robot arm according to a first embodiment 1.
Figure 2:
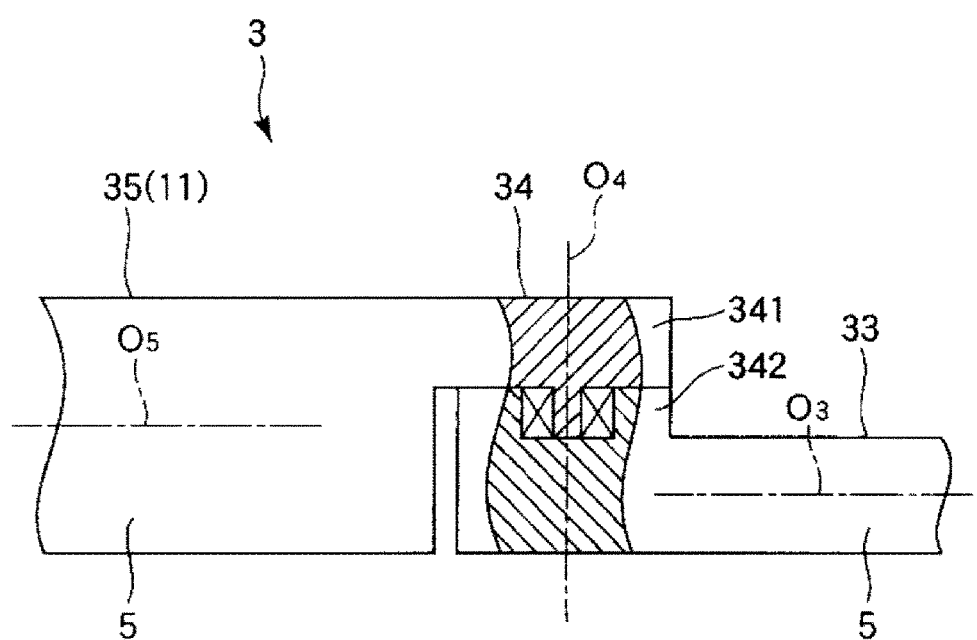
FIG. 2 is a partial sectional view of the robot arm viewed from an arrow A direction in FIG. 1.
Figure 3A:
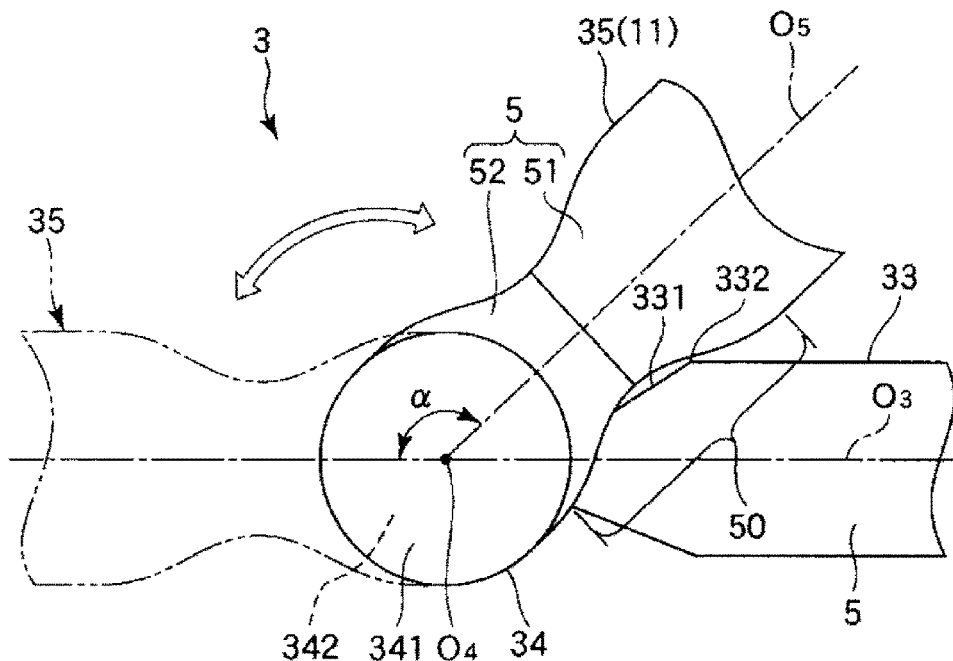
Figure 3B:
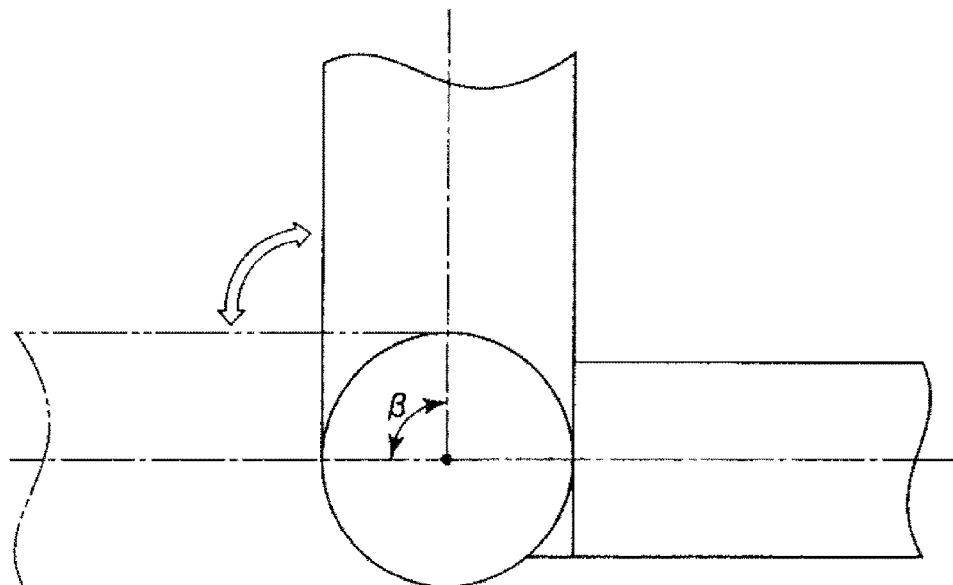
Figure 4:
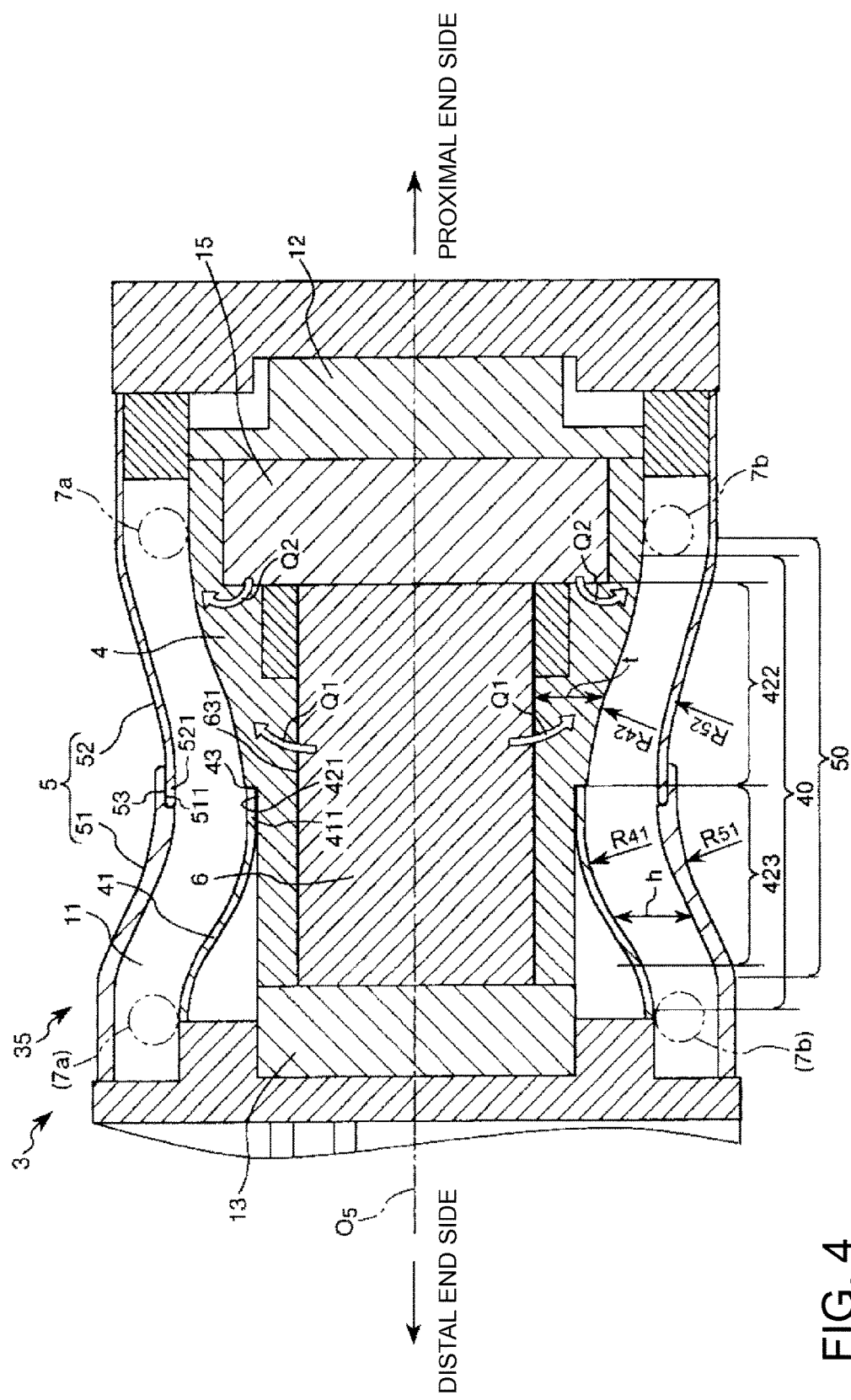
FIG. 4 is a schematic sectional view of an arm section of the robot arm shown in FIG. 1.
Figure 5A:
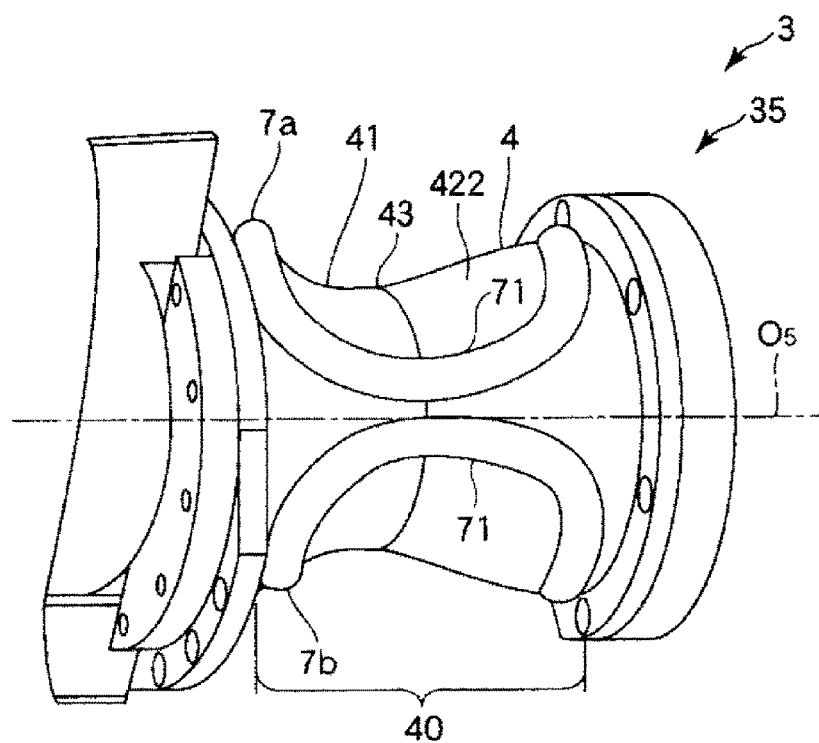
Figure 5B:
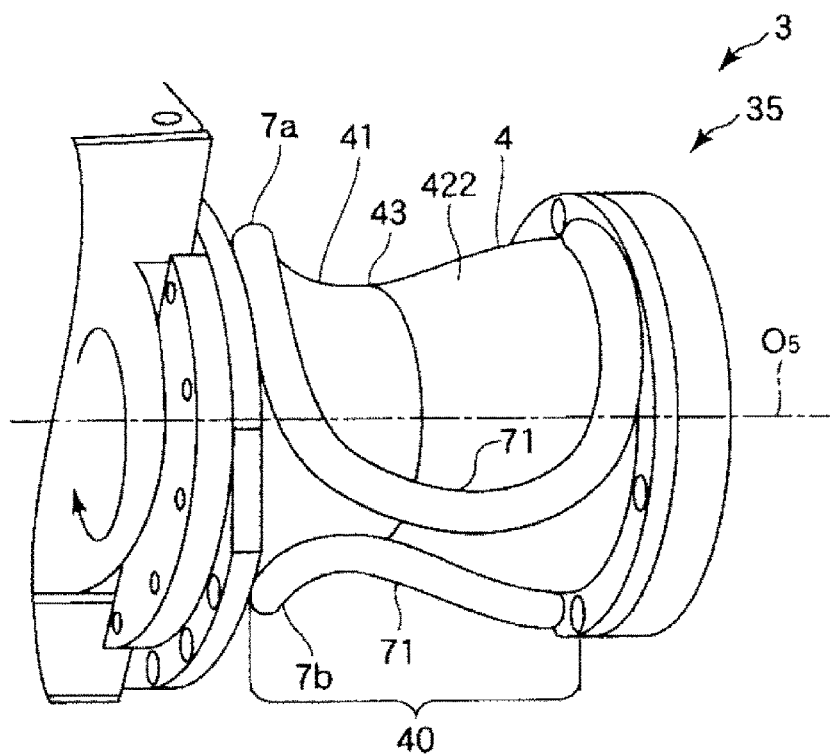
Figure 6A:
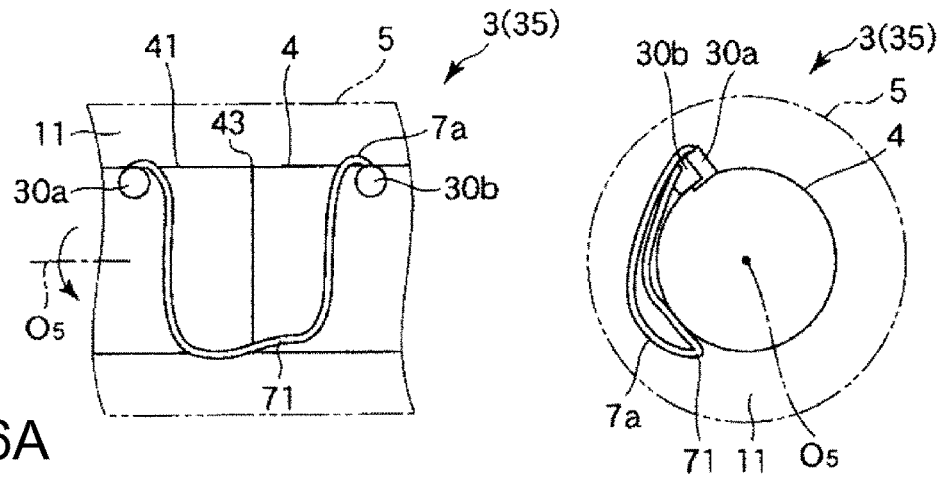
Figure 6B:
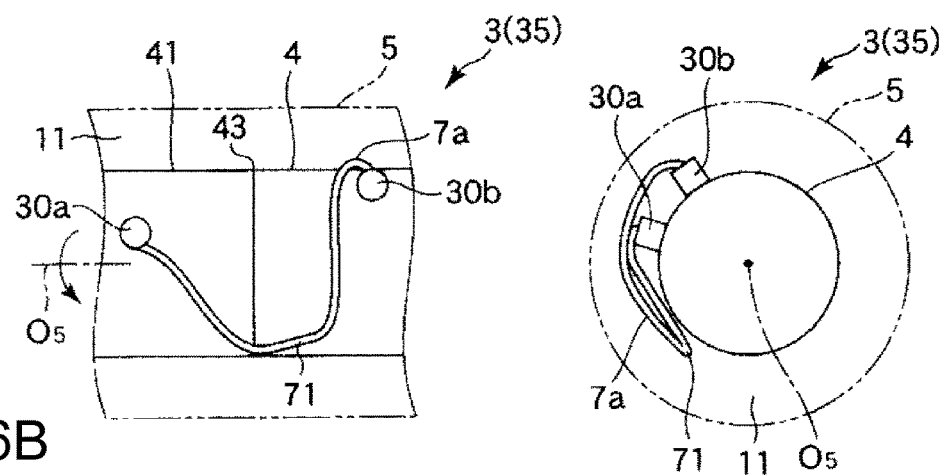
Figure 6C:
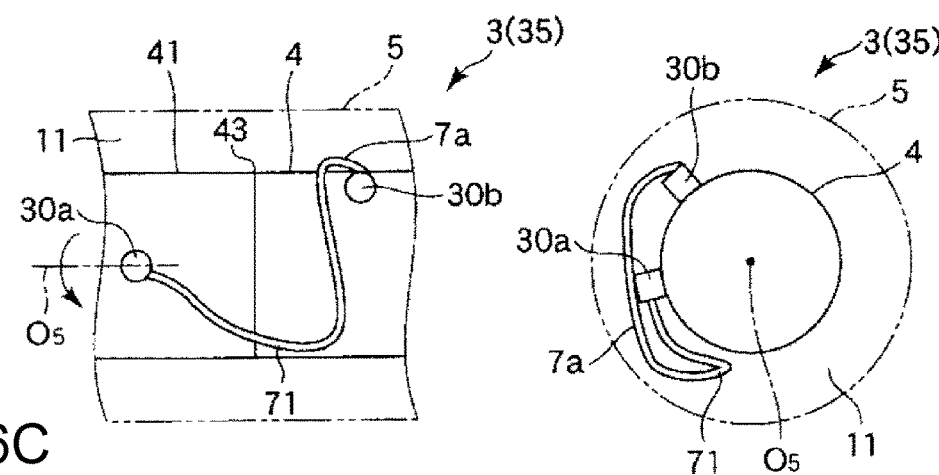

FIG. 1 is a schematic front view showing a robot including a robot arm according to this embodiment. FIG. 2 is a partial sectional view of the robot arm viewed from an arrow A direction in FIG. 1. FIGS. 3A and 3B are diagrams showing turning states of robot arms, wherein FIG. 3A is a turning state of the robot arm shown in FIG. 1 and FIG. 3B shows a turning state of a robot arm in the past. FIG. 4 is a schematic sectional view of an arm section of the robot arm shown in FIG. 1. FIGS. 5A and 5B are perspective views showing twisted states of the robot arm shown in FIG. 1, wherein FIG. 5A shows a state before twisting and FIG. 5B shows a state after the twisting. FIGS. 6A to 6C are schematic side views and schematic views from a proximal end side showing twisted states of the robot arm shown in FIG. 1, wherein FIG. 6A shows a state before twisting, FIG. 6B shows a state during the twisting, and FIG. 6C shows a state after the twisting. Note that, in the following explanation, for convenience of explanation, the upper side in FIG. 1 (and FIG. 7) is referred to "up (or upward)" and the lower side is referred to as "down (downward)". A base side in FIGS. 1 to 6 (and FIG. 7) is referred to as "proximal end" and the opposite side of the base side (an end effector side) is referred to as "distal end".

As shown in FIG. 1, a robot 1 includes one robot arm 3, to which an end effector is detachably mounted, and a base 2 that supports the robot arm 3. The robot 1 is electrically connected to a power supply (not shown) that supplies electric power.

The base 2 can be fixed to, for example, a floor 200 via fixing bolts. The base 2 is sometimes attached with casters and portable. The base 2 includes a case 21 formed in a box shape. Various electric devices such as a motor driver (not shown in the figure) are housed in the case 21.

The robot arm 3 is a robot arm including four arm sections 31, 33, 35, and 37 arranged in order from a proximal end side and arm sections 32, 34, and 36 functioning as joints that couple the arm sections 31, 33, 35, and 37. In the robot arm, the arm section 31 is exemplified as "first arm section", the arm section 32 is exemplified as "second arm section", the arm section 33 is exemplified as "third arm section", the arm section 34 is exemplified as "fourth arm section", the arm section 35 is exemplified as "fifth arm section", the arm section 36 is exemplified as "sixth arm section", and the arm section 37 is exemplified as "seventh arm section".

The arm section 31 can turn around a center axis $O_1$ thereof (a twisted state).

The arm section 32, which couples the arm section 31 and the arm section 33, turnably supports the arm section 33 with respect to the arm section 31 around a center axis (a turning axis) $O_2$ crossing (orthogonal to) or present in a position twisted from the center axis $O_1$.

The arm section 33 can turn around a center axis $O_3$ thereof (a twisted state).

The arm section 34 that couples the arm section 33 and the arm section 35 turnably supports the arm section 35 with respect to the arm section 33 around a center axis (a turning axis) $O_4$ crossing (orthogonal to) or present in a position twisted from the center axis $O_3$.

The arm section 35 can turn around a center axis $O_5$ thereof (a twisted state).

The arm section 36 that couples the arm section 35 and the arm section 37 turnably supports the arm section 37 with respect to the arm section 35 around a center axis (a turning axis) $O_6$ crossing (orthogonal to) or present in a position twisted from the center axis $O_5$.

The arm section 37 can turn around a center axis $O_7$ thereof (a twisted state).

The arm section 37 is located on a most distal end side in the exemplified robot arm 3. An end effector 10 can be detachably mounted on the arm section 37. While work or the like is performed by the end effector 10 in the mounted state, the arm sections 31, 32, 33, 34, 35, 36, and 37 can be actuated (turned) independently from one another. Consequently, the end effector 10 can work.

The arm sections 31, 33, 35, and 37 have substantially the same configurations except that arrangement places are different from one another. Therefore, the arm section 35 is representatively explained below. The arm sections 32, 34, and 36 also have substantially the same configurations except that arrangement places are different from one another. Therefore, the arm section 34 is representatively explained below.

As shown in FIG. 4, the arm section 35 includes a wire body housing space 11 including a motor frame 4 and a cylindrical cover 5. A motor 6 is housed on the inner side of the motor frame 4. Wire bodies 7a and 7b are disposed on the inner side of the cylindrical cover 5 provided on the outer surface of the robot arm 3, that is, between the motor frame 4 and the cylindrical cover 5. Note that, as the wire bodies 7a and 7b, power lines, electric wires of signal lines, cables, or pipes, tubes, or the like for leading gas and liquid are exemplified.

Note that a constituent material of the motor frame 4 and the cylindrical cover 5 is not particularly limited. For example, various metal materials such as aluminum or an aluminum alloy and various resin materials can be used.

As shown in FIG. 2 and FIGS. 3A and 3B, in the arm section 34, a link 341 is inserted into a link 342. Consequently, the arm section 35 can smoothly turn around the link 341 (see FIG. 3A).

As shown in FIG. 4, the motor 6 housed in the motor frame 4 is, for example, a servo motor.

When the motor 6 operates, heat generated by the motor 6 is transferred to the motor frame 4. The motor frame 4 also functions as a heat conductor for heat exhaust and contributes to reducing heat storage of the motor 6.

In the arm section 35, an encoder 12, a reduction gear 13, and a brake 15 configuring an actuator section in conjunction with the motor 6 are housed.

A rotation angle of the motor 6 can be detected by the encoder 12. The posture of the robot arm 3 can be controlled on the basis of a result of the detection.

The reduction gear 13 is a device that includes a plurality of gears, which mesh with one another, and decelerates rotation from the motor 6 and outputs a torque output. As the output, torque proportional to a reduction ratio can be obtained. A driving force is transmitted from the reduction gear 13 to the second link. The second link turns with respect to the first link.

The brake 15 is arranged between the encoder 12 and the motor 6. The brake 15 can surely maintain a stop state of the motor 6 that stops rotating. Consequently, it is possible to prevent the posture of the robot arm 3 from unintentionally changing.

As explained above, the arm section 35 includes the wire body housing space 11 including the motor frame 4 and the cylindrical cover 5.

The motor frame 4 includes a structure such as a stator that surrounds a rotator of the motor 6 in a cylindrical shape and supplies a magnetic force or the like for rotating the rotator. The rotator includes a shaft and a rotor that is fixed to the shaft and supplies a magnetic force or the like. Note that, in this embodiment, the motor frame 4 is set in the robot arm 3. However, a motor cover may be set instead of the motor frame 4.

As shown in FIG. 4, the motor frame 4 includes a thickness increased section 422. The outer diameter of the motor frame 4 increases according to the thickness of the thickness increased section 422.

The cylindrical cover 5 includes a second small body section 50, the length of the body circumference of which is gradually reduced, in a position where the thickness in the longitudinal direction of the arm section 35 is large between the encoder 12 and the reduction gear 13. The motor frame 4 and a reduction gear collar 41 are arranged to be a similar small body on the inner side of the second small body section 50. For convenience, a small body section in the cylindrical cover 5 is represented as second small body section 50 and a small body section formed by the motor frame 4 and the reduction gear collar 41 is referred to as first small body section 40.

The outer surface of the first small body section 40 continuously changes. The first small body section 40 has a shape curved and constricted as a whole to be reduced in the length of the body circumference. Similarly, the surface of the second small body section 50 continuously changes. The second small body section 50 has a shape curved and constricted as a whole. Note that a small body has a shape like a hand drum. However, the cross section of the small body may be an elliptical shape or a polygonal shape other than a circular shape as long as the small body has a constriction.

As shown in FIG. 3A, the arm section 35 can turn around the arm section 34 and approach the arm section 33 from a state in which the robot arm 3 maximally extends, that is, the center axis $O_5$ of the arm section 35 and the center axis $O_3$ of the arm section 33 are parallel to each other. The second small body section 50 is located on the extension in a direction of the approach. Consequently, in a state in which the arm section 35 is closest to the arm section 33, a small diameter end section 331 of the arm section 33 enters the second small body section 50 of the cylindrical cover 5. In the following explanation, an angle in this case is referred to as "maximum turning angle α".

Note that the small diameter end section 331 of the arm 33 has a taper shape in which the outer diameter thereof is gradually reduced in diameter, that is, gradually decreases toward the distal end side.

On the other hand, as shown in FIG. 3B, the robot arm in the past does not include the cylindrical cover 5 and the small diameter end section 331 formed in the taper shape. Therefore, even if the robot arm changes from a maximally extended state to a maximally bent state, arm main bodies interfere (collide) with each other before reaching the maximum turning angle α. A maximum turning angle β is extremely smaller than the maximum turning angle α.

In this way, in the robot arm 3, when the arm section 35 turns with respect to the arm section 33, the arm section 35 can turn until the small diameter end section 331 of the arm 33 enters the cylindrical cover 5 of the arm section 35. Consequently, it is possible to secure the maximum turning angle α as large as possible, that is, secure a turning range of the arm section 35 as wide as possible.

The small diameter end section 331 formed in the taper section contributes to securing the turning range of the arm section 35 as wide as possible.

As shown in FIG. 4, the first small body section 40 is formed by the motor frame 4 and the reduction gear collar 41.

The motor frame 4 includes, in an outer circumferential section 631, a step section 421 formed to be recessed. A proximal end section 411 of the reduction gear collar 41 fixed to the reduction gear 13 is inserted into the step section 421. Consequently, steep unevenness facing the outer side is prevented or suppressed in a boundary section 43 between the motor frame 4 and the reduction gear collar 41. Therefore, it is possible to prevent the wire bodies 7a and 7b from being damaged by the unevenness.

The cylindrical cover 5 is divided into two members halfway in the center axis $O_5$ direction of the arm section 35 and includes a first member 51 formed in a tubular shape on the distal end side and a second member 52 formed in a tubular shape on the proximal end side. The second small body section 50 of the cylindrical cover 5 is also formed to extend across the first member 51 and the second member 52.

The first member 51 includes a step section 511 formed to be cut in a proximal end inner circumferential section of the first member 51 and equivalent to the thickness of the second member 52. A distal end section 521 of the second member 52 is inserted into, that is, laid on the step section 511. Consequently, steep unevenness facing the inner side is prevented or suppressed in a boundary section 53 between the first member 51 and the second member 52. Therefore, it is possible to prevent the wire bodies 7a and 7b from being damaged by the unevenness.

As shown in FIG. 4, the distal end sections of the reduction gear collar 41 and the first member 51 are coupled and fixed. The proximal end sections of motor frame 4 and the second member 52 are coupled and fixed. The reduction gear collar 41 and the first member 51 coupled to each other and the motor frame 4 and the second member 52 coupled to each other can relatively turn around the center axis $O_5$ according to the operation of the motor 6. According to the turning, the arm section 35 is twisted around the center axis $O_5$.

Note that the reduction gear collar 41 is a brim-like article provided in the turning axis or across section isosceles trapezoidal article widening toward the axis center of the turning axis.

As explained above, the first small body section 40 is formed by the motor frame 4 and the reduction gear collar 41. In the cylindrical cover 5, the second small body section 50 is formed to extend across the first member 51 and the second member 52.

As shown in FIG. 4, as the curvature of the first small body section 40, a curvature on the reduction gear collar 41 side (one end side) (=1/curvature radius $R_{41}$) and a curvature on the motor frame 4 side (the other end side) (=1/curvature radius $R_{42}$) are different. The curvature on the reduction gear collar 41 side is larger than the curvature on the motor frame 4 side.

As the curvature in the second small body section 50, a curvature on the first member 51 side (one end side) (=1/curvature radius $R_{51}$) and a curvature on the second member 52 side (the other end side) (=1/curvature radius $R_{52}$) are different. The curvature on the first member 51 side is larger than the curvature on the second member 52 side.

For example, as shown in FIG. 3A, in a state in which the robot arm 3 is maximally bent, a portion on the first member 51 side of the second small body section 50 of the cylindrical cover 5 faces a corner section (a terminal end) 332 of the small diameter end section 331 of the arm section 33. The curvature on the first member 51 side is preferably large such that the corner section 332 can deeply enter the second small body section 50 of the cylindrical cover 5. Consequently, it is possible to secure the turning range of the arm section 35 as wide as possible.

As shown in FIG. 4, according to such a magnitude relation of the curvatures, a gap distance h of the wire body housing space 11 formed between the first small body section 40 and the second small body section 50 is substantially fixed along the center axis $O_5$. The gap distance h is secured larger than the thickness of the wire bodies 7a and 7b. Consequently, the wire bodies 7a and 7b housed between a surface including the first small body section 40 and a surface including the second small body section 50 and inserted through the surfaces can be prevented from receiving an excessive pressing force from the small body sections.

Note that the wire bodies 7a and 7b are power lines for supplying electric power to the sections of the robot 1, signal lines for exchange of signals between devices, pipes for leading gas and liquid, or the like. For example, one of the wire bodies 7a and 7b is a wire body for supplying electric power to the end effector 10 mounted on the arm section 37. The other is a wire body for supplying electric power to the motor 6. Consequently, the end effector 10 is enabled to operate and can grip an object to be gripped and releases the gripped object to be gripped. Further, the motor 6 is enabled to operate and a twisting motion of the arm section 35 is performed.

The wire bodies 7a and 7b have the same configuration except that functions are different. Therefore, the wire body 7a is representatively explained below. Note that, in FIGS. 6A and 6B, the wire body 7a is representatively drawn.

As shown in FIGS. 5A and 5B and FIGS. 6A to 6C, between the first small body section 40 and the second small body section 50, a part of the wire body 7a is wound around the longitudinal axis of the arm section 35, that is, around the center axis $O_5$. Since the wire body 7a is wound around the small body section, the total length of the wire body 7a can be reduced by a reduced diameter in the small body section. Consequently, it is possible to reduce costs of the wire body 7a itself. Further, when the wire body 7a is drawn around, it is possible to quickly and easily perform the drawing-around work.

Between the first small body section 40 and the second small body section 50, the distal end (one end side) of the wire body 7a is fixed to the reduction gear collar 41, which configures the motor frame 4, by a cable clamp 30a and the proximal end side (the other end side) of the wire body 7a is fixed to the motor frame 4 by a cable clamp 30b (see FIGS. 6A to 6C).

Further, the wire body 7a is curved and folded back halfway and housed in a U shape.

A folded-back section 71 of the wire body 7a is close to the fold-back section 71 of the wire body 7b. However, the folded-back sections 71 do not interfere with (cross) each other (see FIGS. 5A and 5B).

In the wire body 7a wired as explained above, as shown in FIGS. 5A and 5B and FIGS. 6A to 6C, even if the reduction gear collar 41 turns around the center axis $O_5$ with respect to the motor frame 4, an unintended kink of the folded-back section 71 is prevented. Therefore, the life of the wire body 7a can be secured long.

As shown in FIG. 4, the thickness increased section 422 and a thickness fixed section 423 are provided in the motor frame 4. In the thickness increased section 422, thickness t (average thickness) of the motor frame 4 of the arm section 35 increases in thickness in a direction away from the reduction gear 13, that is, toward the proximal end side. In the thickness fixed section 423, the thickness t is fixed along the center axis $O_5$ (the center axis of the wire body housing space 11) direction. The thickness fixed section 423 is provided further on the distal end side than the thickness increased section 422. The brake 15 is arranged further on the proximal end side than the thickness increased section 422.

The thickness increased section 422 and the thickness fixed section 423 are parts of the wire body housing space 11. Therefore, specific heat $c_{422}$ of the thickness increased section 422 and specific heat $c_{423}$ of the thickness fixed section 423 are the same. On the other hand, the thickness t is larger in the thickness increased section 422 than in the thickness fixed section 423. Therefore, mass $m_{422}$ of the thickness increased section 422 is larger than mass $m_{423}$ of the thickness fixed section 423. Since a heat capacity is a product of specific heat and mass, a heat capacity $C_{422}$ of the thickness increased section 422 is $c_{422} \times m_{422}$ and a heat capacity $C_{423}$ of the thickness fixed section 423 is $c_{423} \times m_{423}$. In this case, the heat capacity $C_{422}$ is larger than the heat capacity $C_{423}$.

When the motor 6 operates and the brake 15 operates according to the operation of the motor 6, heat $Q_1$ is generated from the motor 6 and heat $Q_2$ is generated from the brake 15. In general, a degree of heat transfer is different according to the magnitude of a heat capacity of a medium (a heat medium). Therefore, the heat $Q_1$ and the heat $Q_2$ are preferentially transferred from the thickness increased section 422, which has the larger heat capacity, to the proximal end side. The heat transferred to the proximal end side is gradually radiated during the transfer. Consequently, it is possible to reduce heating of the motor 6 and the brake 15.

In the thickness increased section 422, the thickness t changes (increases) stepwise. Consequently, the heat $Q_1$ and the heat $Q_2$ are surely transferred to the proximal end side through the thickness increased section 422.

In particular, in the case of an arm section mounted with the end effector 10, since sensors susceptible to heat such as a force sensor are set between the arm section and the end effector 10, it is preferable that exhaust heat is transferred to the proximal end side rather than the distal end side.

First Embodiment 2

Figure 7:
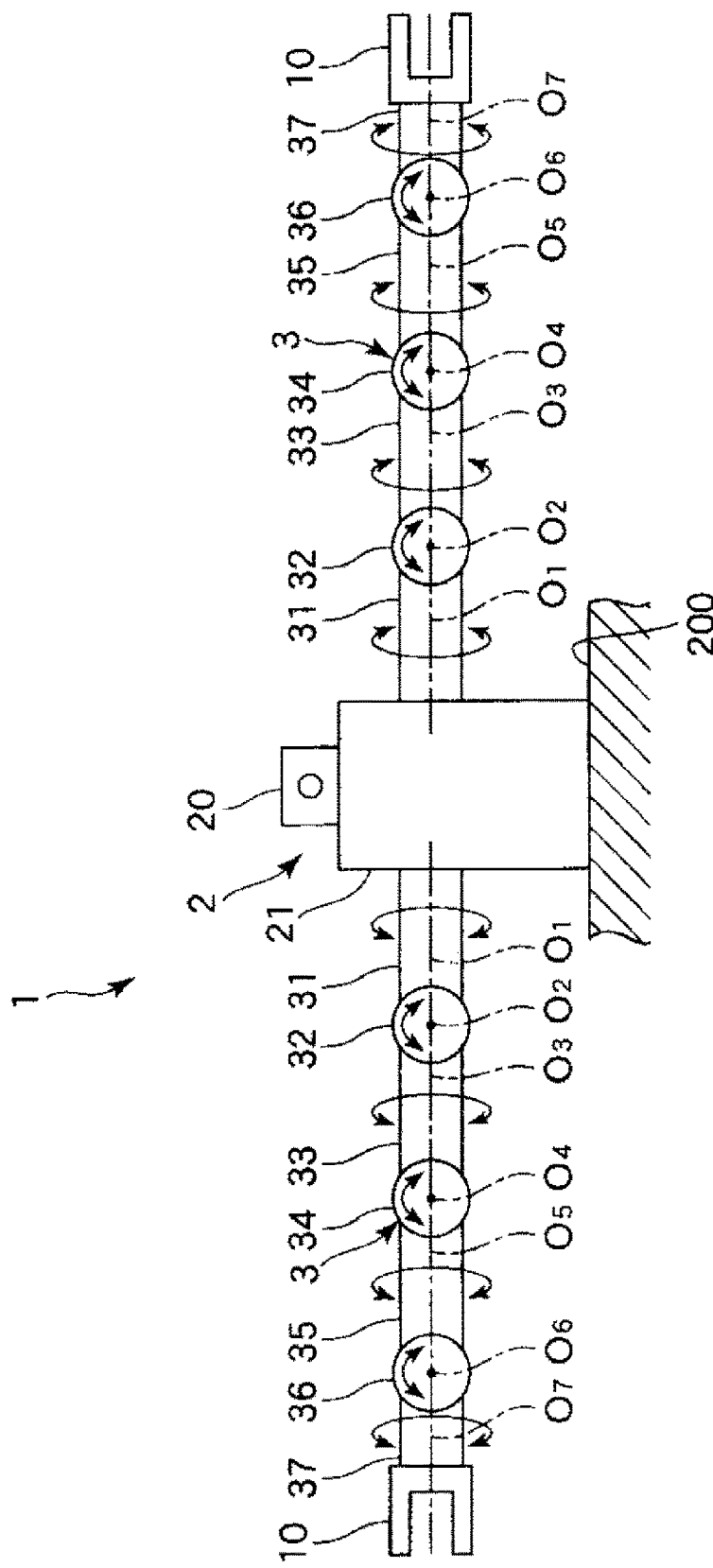
FIG. 7 is a schematic front view showing a robot including a robot arm according to a first embodiment 2.

FIG. 7 is a schematic front view showing a robot including a robot arm according to this embodiment.

The robot arm and the robot according to this embodiment are explained below with reference to the figure. However, differences from the embodiment explained above are mainly explained. Explanation of similarities is omitted.

This embodiment is the same as the first embodiment 1 except that the number of robot arms is different.

As shown in FIG. 7, in this embodiment, the robot 1 includes a plurality of robot arms 3, a body section functioning as the base 2 that supports the robot arms 3, and a camera 20 functioning as an image pickup device set on the base 2. Such a double-arm robot 1 is used in a production system of a cell production method (a variable model variable quantity production system corresponding to a demand) for assembling and manufacturing a precision apparatus (an electronic apparatus) such as a printer or a camera in end effectors 10 of the plurality of robot arms 3 while visually recognizing the precision apparatus with the camera 20.

The robot arm and the robot in this embodiment are explained concerning the embodiments shown in the figures. However, the invention is not limited to the embodiments. The sections configuring the robot arm and the robot can be replaced with a robot arm and a robot having any configurations that can show similar functions. Any components may be added.

The robot arm and the robot according to the invention may be a robot arm and a robot obtained by combining any two or more configurations (characteristics) in the embodiments.

The number of robot arms included in the robot is one in the first embodiment 1 and is two in the first embodiment 2. However, the number of robot arms is not limited to these numbers and may be, for example, three or more.

The number of arm sections coupled by the robot arm is not limited to the numbers in the embodiments.

In the thickness increased section, the thickness t changes stepwise in the embodiments. However, the thickness increased section is not limited to this. For example, the thickness t may continuously change.

Second Embodiment 1

Figure 8:
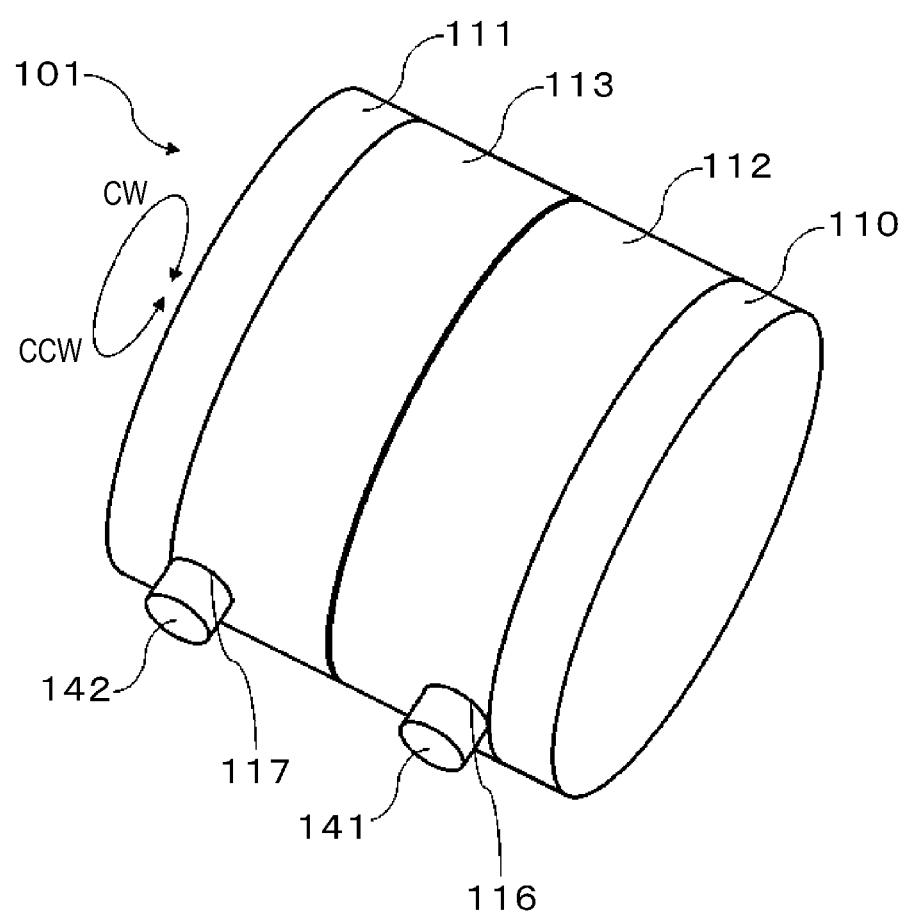
FIG. 8 is a perspective view showing the external shape of an actuator according to a second embodiment 1.
Figure 9A:
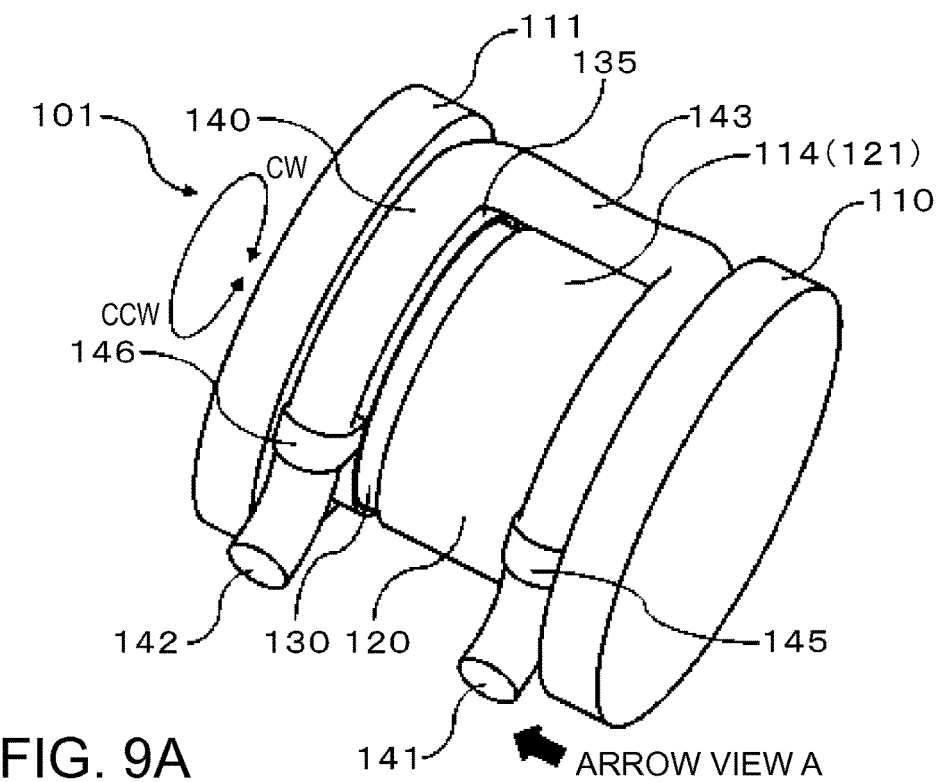
FIGS. 9A and 9B are a perspective view and a sectional view showing an inside in a state in which a cylindrical outer cylinder is removed in the actuator according to the second embodiment 1.
Figure 9B:
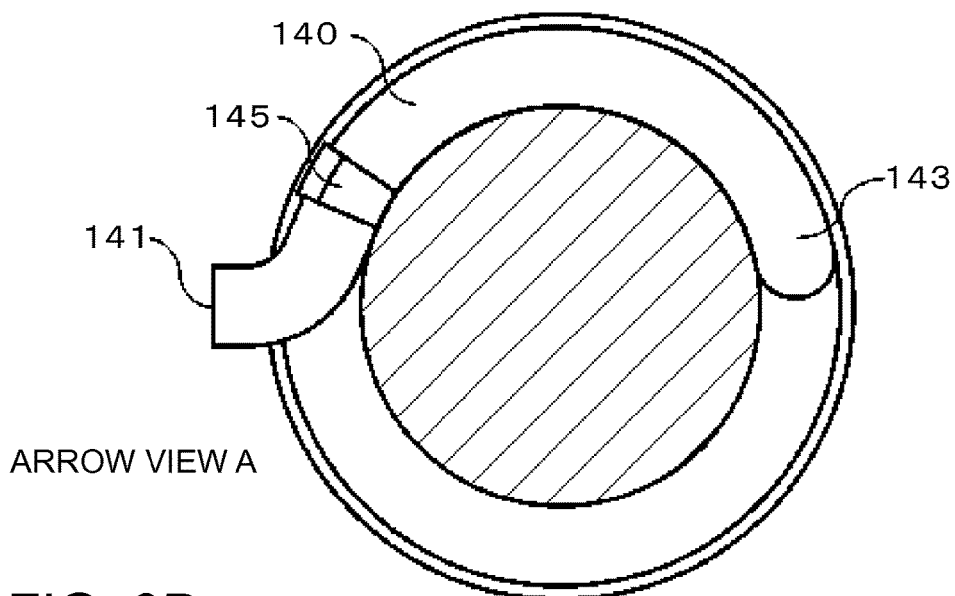

FIG. 8 is a perspective view showing an external shape of an actuator 101 according to this embodiment. FIGS. 9A and 9B are a perspective view and a sectional view showing an inside in a state in which a cylindrical outer cylinder is removed in the actuator 101 according to this embodiment.

The actuator 101 according to this embodiment is explained below with reference to the figures. However, differences from the embodiment explained above are mainly explained. Explanation of similarities is omitted.

In the actuator 101 according to this embodiment, as shown in FIG. 8, a base point link (a first link) 110 and a turning link (a second link) 111 are turnably arranged. A transmission shaft outer cylinder 112 and a reduction gear output axis outer cylinder 113 are arranged between the base point link 110 and the turning link 111. In the transmission shaft outer cylinder 112, a base point link wire body extraction port 116 is provided and a base point link fixed wire body 141 is arranged. In the reduction gear output axis outer cylinder 113, a turning link wire body extraction port 117 is provided and a turning link fixed wire body 142 is arranged.

As shown in FIGS. 9A and 9B, in the actuator 101, a motor 120, a reduction gear 130, a reduction gear output shaft collar 135, and a wire body 140 are arranged between the base point link 110 and the turning link 111.

The wire body 140 is housed in a space surrounded by the transmission shaft outer cylinder 112, the reduction gear output shaft outer cylinder 113, a transmission shaft 114, the reduction gear 130, the reduction gear output shaft collar 135, the base point link 110, and the turning link 111. The wire body 140 is at least one of a wire and a pipe. Note that the wire body 140 is a general term of a power line, a signal line, a gas pipe for supplying gas, a liquid pipe for supplying liquid, and the like. Note that the gas pipe also includes a vacuum pipe.

The wire body 140 is fixed to the base point link 110 by a base point link wire body clamp 145 and fixed to the turning link 111 by a turning link wire body clamp 146. The wire body 140 includes a wire body movable section 143 held by the base point link wire body clamp 145 and the turning link wire body clamp 146, the base point link fixed wire body 141 fixed to the base point link 110, and the turning link fixed wire body 142 fixed to the turning link 111.

The base point link wire body clamp 145 may fix the wire body 140 to be closer to the transmission shaft 114 side. The turning link wire body clamp 146 may fix the wire body 140 to be closer to the reduction gear output shaft outer cylinder 113. By fixing the wire body 140 in this way, it is possible to reduce contact of the wire body 140 with the inner circumference of the transmission shaft outer cylinder 112 and the transmission shaft 114 and improve the durability of the wire body 140.

The wire body 140 is arranged along the outer circumferences of the transmission shaft 114, a reduction gear frame 131, the reduction gear output shaft collar 135, and the reduction gear 130, the inner circumference of the transmission shaft outer cylinder 112, and the inner circumference of the reduction gear output shaft outer cylinder 113. The wire body movable section 143 is arranged to be folded back in a U shape along the circumferential direction of the transmission shaft 114 and a reduction gear output shaft 133 (see FIG. 10).

When the turning link 111 turns with respect to the base point link 110, the position of a U-shape bent section of the wire body movable section 143 moves. Consequently, stress acting on the wire body 140 is reduced. In this case, the wire body 140 involves only bending deformation and does not involve torsional deformation. The entire wire body movable section 143 absorbs stress acting on the wire body 140 according to the movement of the U-shape section. Therefore, the stress acting on the wire body 140 is small. It is possible to improve the durability of the wire body 140.

Figure 10:
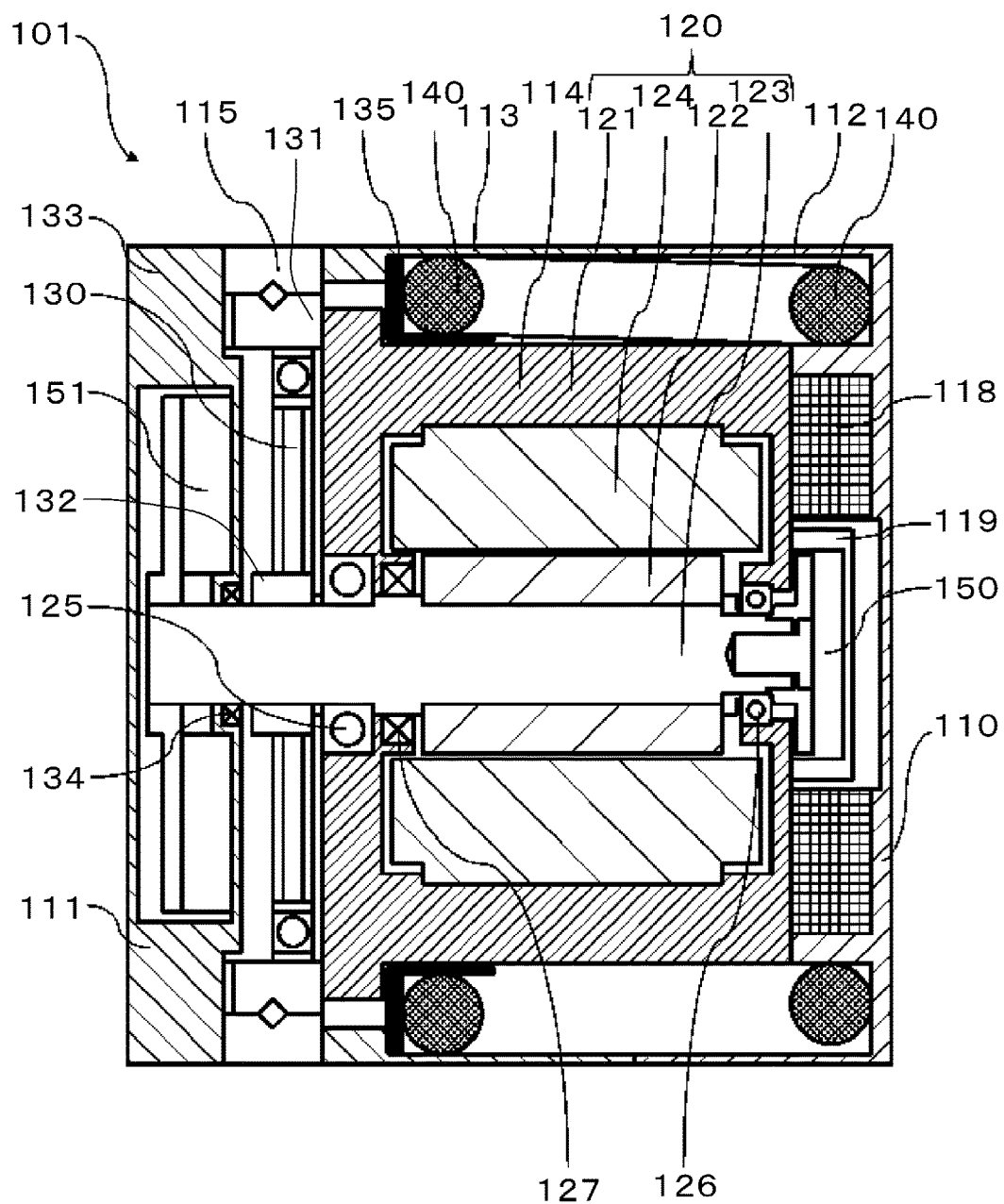
FIG. 10 is a sectional view showing an internal structure of the actuator according to the second embodiment 1.

FIG. 10 is a sectional view showing an internal structure of an actuator 101 according to this embodiment. The actuator 101 includes, as shown in FIG. 10, the motor 120, the reduction gear 130, the reduction gear output shaft collar 135, the reduction gear output shaft 133, the transmission shaft 114 including a motor frame 121 of the motor 120 as at least a part, the transmission shaft outer cylinder 112, the reduction gear output shaft outer cylinder 113, a position detector 150, a mechanical brake 151, a joint supporting bearing 115, a rotor shaft supporting main bearing 125, a rotor shaft supporting driven bearing 126, a motor oil seal 127, a reduction gear oil seal 134, a motor driving circuit 118, and a position detector processing circuit 119.

The motor 120 includes the motor frame 121, a rotor 122, a rotor shaft 123, a stator 124, the rotor shaft supporting main bearing 125, the rotor shaft supporting driven bearing 126, and the motor oil seal 127. The rotor shaft 123 is supported by the rotor shaft supporting main bearing 125 and the rotor shaft supporting driven bearing 126 and connected to a reduction gear input shaft 132 on the inside of the reduction gear 130. The motor oil seal 127 prevents grease or lubricant for lubricating the inside of the reduction gear 130 from intruding into between the rotor 122 and the stator 124.

The reduction gear 130 includes the reduction gear frame 131, the reduction gear input shaft 132, the reduction gear output shaft 133, the reduction gear oil seal 134, the joint supporting bearing 115, and a gear mechanism. The reduction gear frame 131 is connected to the base point link 110 via the motor frame 121 and the transmission shaft 114. The reduction gear output shaft 133 is connected to the turning link 111. The reduction gear input shaft 132 is connected to the rotor shaft 123 of the motor 120 on the inside of the reduction gear 130. The reduction gear 130 increases torque generated by the motor 120 in the gear mechanism, extracts the torque to the reduction gear output shaft 133, and drives the turning link 111.

In this embodiment, a wave gear is used as the gear mechanism of the reduction gear 130. However, other deceleration mechanism may be used.

The reduction gear output shaft collar 135 is connected to the reduction gear output shaft 133 and arranged in the outer circumference of the reduction gear frame 131 or the transmission shaft 114. The reduction gear output shaft collar 135 prevents the wire body 140 from coming into contact with the reduction gear frame 131 or the transmission shaft 114.

The reduction gear oil seal 134 prevents the grease or the lubricant for lubricating the inside of the reduction gear 130 from flowing out to the mechanical brake 151 side.

The transmission shaft 114 also functions as the motor frame 121. On the inside of the transmission shaft 114, the rotor 122, the rotor shaft 123, and the stator 124 configuring the motor 120, the rotor shaft supporting main bearing 125, the rotor shaft supporting driven bearing 126, and the motor oil seal 127 are arranged. One end face of the transmission shaft 114 is connected to the reduction gear frame 131. The other end face is connected to the base point link 110. The transmission shaft 114 transmits reaction of torque for driving the turning link 111 to the base point link 110.

By integrating at least a part of the transmission shaft 114 with the motor frame 121, the length in the radial direction of the actuator 101 can be reduced compared with when the motor frame 121 is arranged separately from the transmission shaft 114. Therefore, the actuator 101 can be reduced in size and weight. Heat generated from the stator 124 during the driving of the motor 120 can be radiated via the transmission shaft 114. Therefore, it is possible to configure the actuator 101 having a high heat radiation property.

The wire body 140 is housed in a space surrounded by the transmission shaft outer cylinder 112 and the motor frame 121 or the transmission shaft 114 and a space surrounded by the reduction gear output shaft outer cylinder 113 and the reduction gear frame 131 or the transmission shaft 114.

The joint supporting bearing 115 supports, with a cantilever structure, the turning link 111 with respect to the base point link 110. In this embodiment, a joint supporting method of the cantilever structure is used. However, a joint supporting method of a twin holding structure may be used.

The position detector 150 may be arranged on the inside of the base point link 110. Consequently, the length between the base point link 110 and the turning link 111 can be reduced and the actuator 101 can be reduced in size. As the position detector 150, a unit structure may be used or a module structure may be used.

The rotor shaft 123 may be connected to an input shaft of the mechanical brake 151 piercing through the center of the reduction gear output shaft 133 and arranged on the inside of the turning link 111. Consequently, the length between the base point link 110 and the turning link 111 can be reduced and the actuator 101 can be reduced in size.

The joint driving device 101 may include the motor driving circuit 118 and the position detector processing circuit 119. The motor driving circuit 118 and the position detector processing circuit 119 may be arranged between the transmission shaft outer cylinder 112 and the transmission shaft 114, between the reduction gear output shaft outer cylinder 113 and the reduction gear frame 131, or the inside of the base point link 110 or the turning link 111. Consequently, the length between the base point link 110 and the turning link 111 can be reduced and the actuator 101 can be reduced in size.

The stator 124 of the motor 120 may be shrunk-fit in or press-inserted into the motor frame 121. Consequently, by shrink-fitting or press-inserting the stator 124, components for fixing the stator 124 to the motor frame 121 can be reduced, the actuator 101 can be reduced in size, and costs can be reduced.

Since FIG. 10 is a schematic diagram, a sectional view is omitted. Scales are set to clearly show the figure. The wire body 140 is a single wire body or is formed by binding a plurality of wire bodies. The wire body 140 is bendable. The wire body 140 can bend following motions of the base point link 110 and the turning link 111 that turn with respect to each other.

The operation of the actuator 101 in this embodiment configured as explained above is explained.

When the motor 120 is driven, the turning link 111 connected to the reduction gear output shaft 133 turns with respect to the base point link 110 connected to the transmission shaft 114. The U-shaped wire body movable section 143 moves in a space surrounded by the reduction gear output shaft 133 and the reduction gear output shaft outer cylinder 113 or the transmission shaft 114 and the transmission shaft outer cylinder 112, whereby the wire body 140 absorbs an angle change of the base point link 110 and the turning link 111.

When the turning link 111 turns clockwise (CW) with respect to the base point link 110, the wire body 140 moves to be rolled in and moves while winding around the reduction gear output shaft collar 135. Conversely, when the turning link 111 turns counterclockwise (CCW), the wire body 140 moves to be pushed out and moves along the reduction gear output shaft outer cylinder 113 and the transmission shaft outer cylinder 112. In this operation, only bending deformation acts on the wire body 140. The U-shaped bent section moves on the wire body 140 according to the turn of the link. Therefore, it is possible to absorb the stress of the bending deformation with the entire wire body 140 and improve the durability of the wire body 140.

According to this embodiment, the rotor shaft 123 has a solid structure. Compared with a shaft having a hollow structure, the rotor shaft 123 has small inertia and can accelerate and decelerate at high speed. Compared with the shaft having the hollow structure, the rotor shaft 123 having the solid structure has a small outer diameter. Relative speed of the contact section with the oil seal is low. Therefore, the rotor shaft 123 has small heat generation and can turn at high speed.

FIGS. 11A to 11E are schematic diagrams showing the movement of the wire body 140 of the actuator 101 according to this embodiment. In other words, FIGS. 11A to 11E are schematic diagrams showing deformation of the wire body 140 involved in the turn of the link according to this embodiment. A relation between the turn of the turning link 111 with respect to the base point link 110 and the movement of the U-shaped bent section of the wire body movable section 143 is explained with reference to the figures.

Figure 11A:
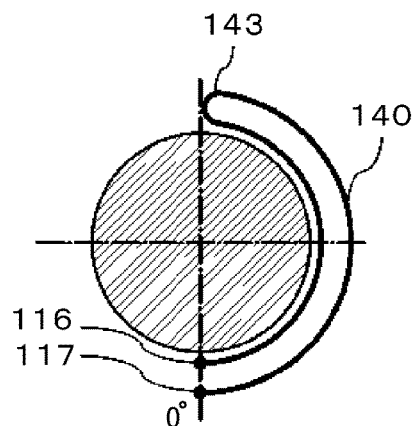
FIGS. 11A to 11E are schematic diagrams showing movements of a wire body of the actuator according to the second embodiment 1.

FIG. 11A shows a reference position where the base point link wire body extraction port 116 and the turning link wire body extraction port 117 are in the same circumferential direction of the actuator 101. An angle formed by the base point link 110 and the turning link 111 is 0 degree.

Figure 11B:
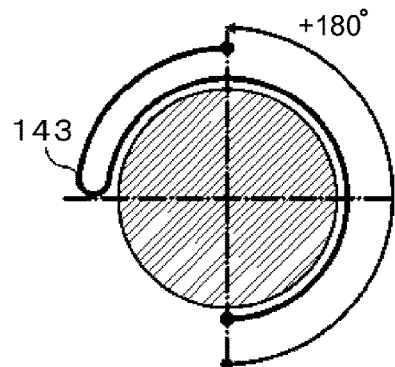

FIG. 11B shows deformation of the wire body 140 at the time when the turning link 111 turns +180 degrees with respect to the base point link 110. The position of the U-shaped bent section of the wire body movable section 143 moves at a half angle with respect to the turning angle of the turning link 111 because the wire body 140 is folded back in the U shape. In this case, the U-shaped bent section moves to a position of 270 degrees (=initial position 180+moving amount 180/2).

Figure 11D:
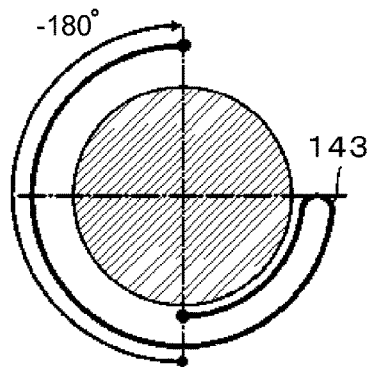
Figure 11C:
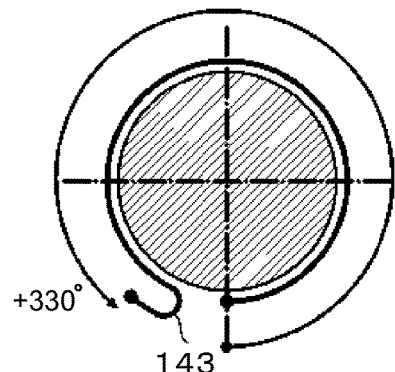

FIG. 11C shows deformation of the wire body 140 at the time when the turning link 111 turns +330 degrees with respect to the base point link 110. In this case, the U-shaped bent section moves to a position of 345 degrees (=initial position 180+moving amount 330/2).

FIG. 11D shows deformation of the wire body 140 at the time when the turning link 111 turns −180 degrees with respect to the base point link 110. In this case, the U-shaped bent section moves to a position of 90 degrees (=initial position 180−moving amount 180/2).

Figure 11E:
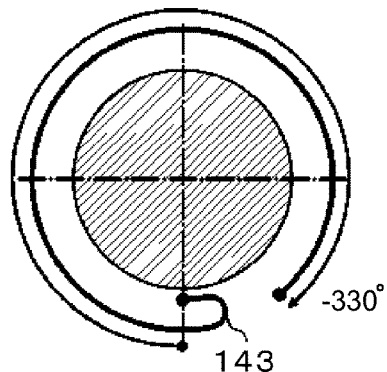

FIG. 11E shows deformation of the wire body 140 at the time when the turning link 111 turns +330 degrees with respect to the base point link 110. In this case, the U-shaped bent section moves to a position of 15 degrees (=initial position 180−moving amount 330/2).

An angle range in which the turning link 111 can turn with respect to the base point link 110 is a range in which the U-shaped bent section does not climb over the base point link fixed section in the plus direction and a range in which the U-shaped bent section does not climb over the turning link fixed section in the minus direction. According to this condition, ideally, the turning link 111 can turn ±360 degrees with respect to the base point link 110.

Figure 12:
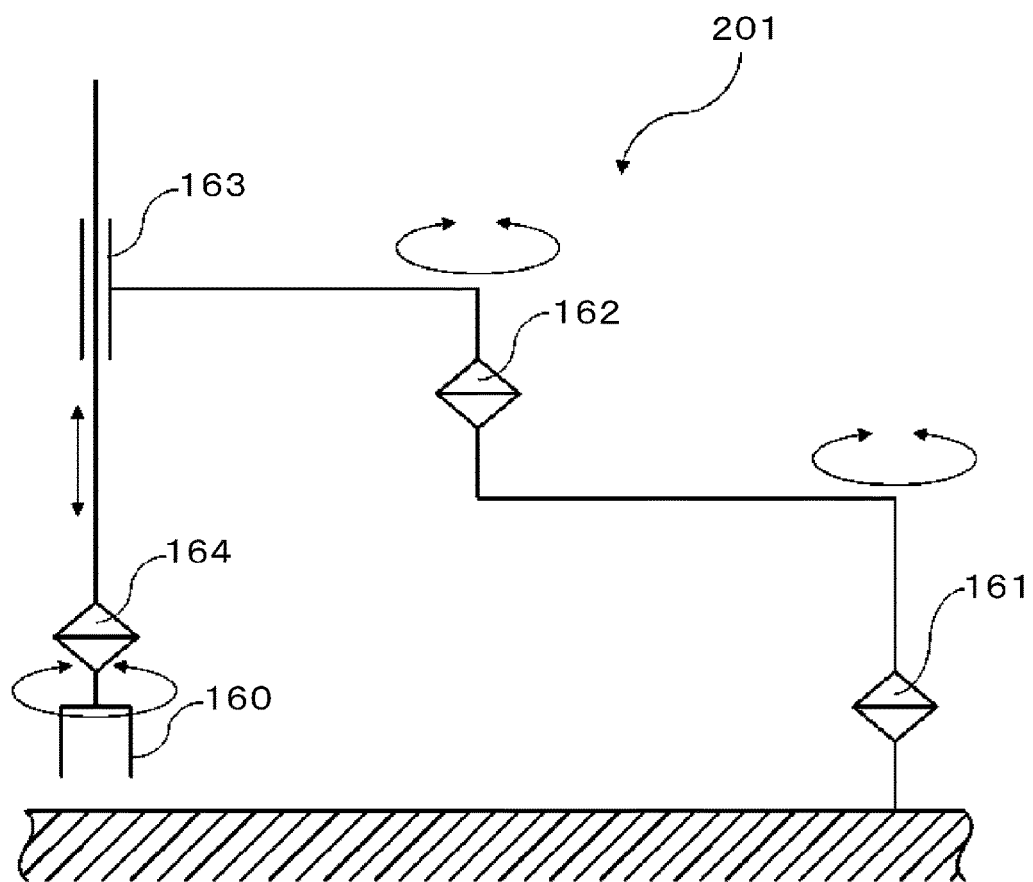
FIG. 12 is a schematic diagram showing the configuration of a scalar type robot according to the second embodiment 1.
Figure 13:
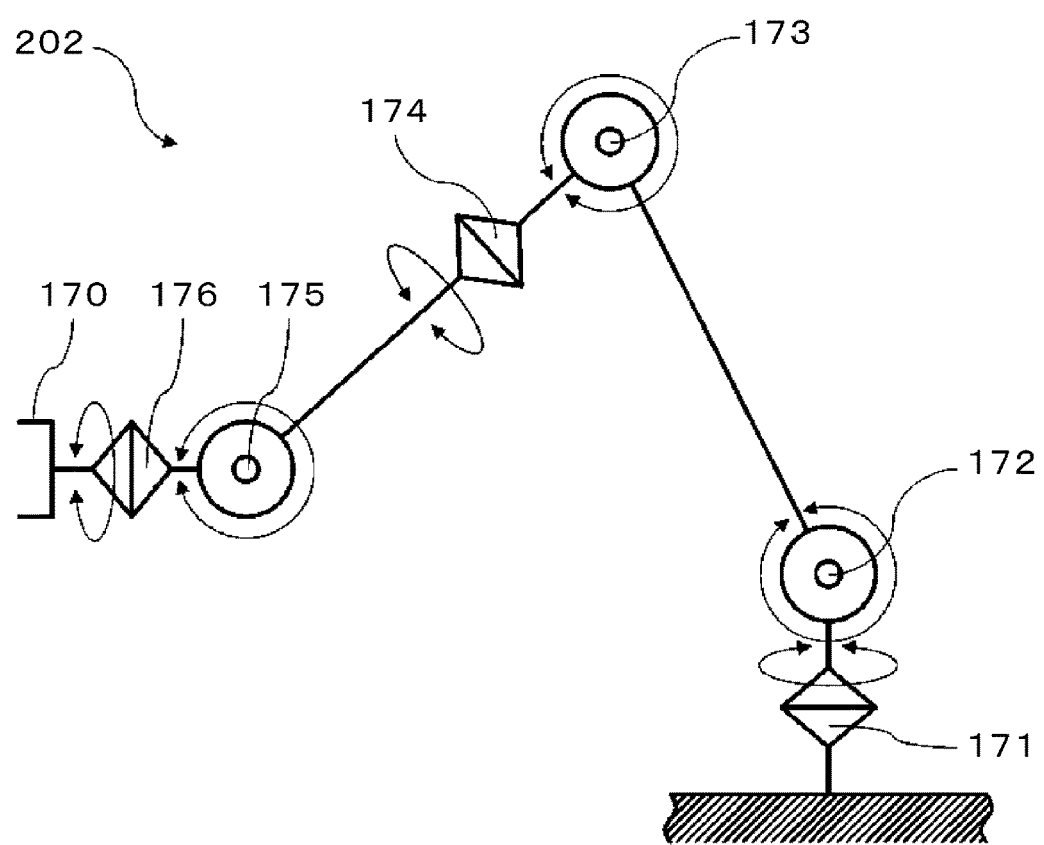
FIG. 13 is a schematic diagram showing the configuration of a six-axis vertical multi-joint type robot according to the second embodiment 1.
Figure 14:
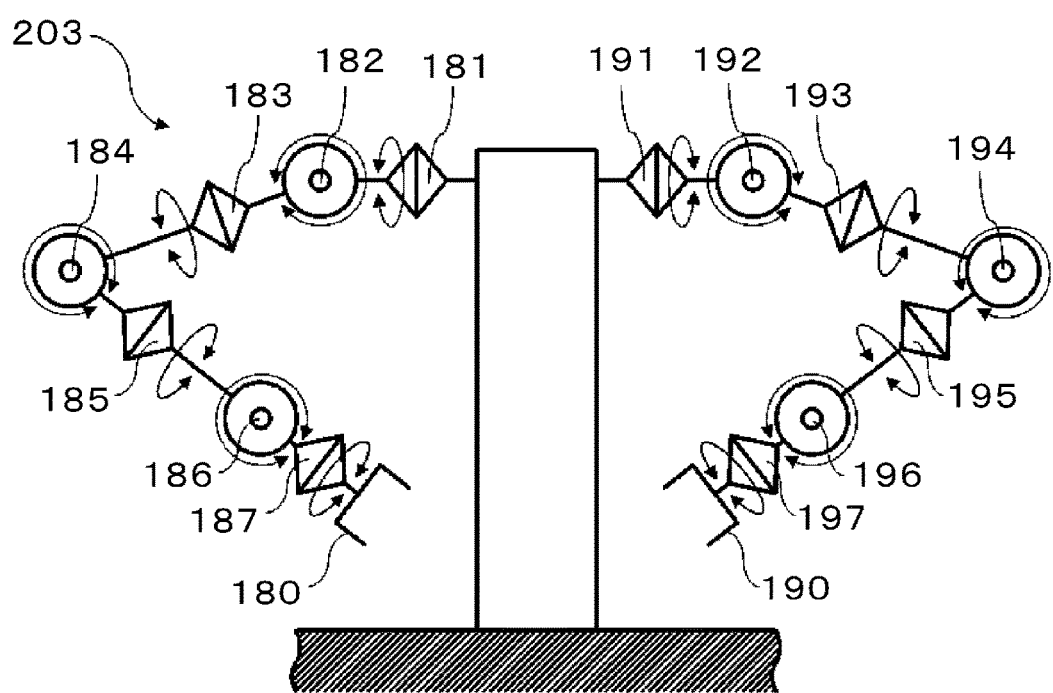
FIG. 14 is a schematic diagram showing the configuration of a double-arm seven-axis robot according to the second embodiment 1.

Next, an implementation mode of the robot including the actuator according to this embodiment is exemplified. FIGS. 12, 13, and 14 are schematic diagrams showing the robot arm of the robot according to this embodiment.

FIG. 12 is a schematic diagram showing the configuration of a scalar type robot 201 according to this embodiment. In other words, FIG. 12 is a schematic diagram of the scalar type robot 201 applied with the invention.

A J1 axis actuator 161, a J2 axis actuator 162, a J3 axis actuator 163, a J4 axis actuator 164, and an end effector 160 are sequentially arranged from a manipulator main body. The invention can be applied to the J1 axis actuator 161, the J2 axis actuator 162, and the J4 axis actuator 164 configured by turning joints. The J1 axis actuator 161, the J2 axis actuator 162, and the J4 axis actuator 164 are arranged in directions in which the joints are bent.

According to this embodiment, the width and the height of the joints configuring the scalar type robot 201 can be reduced. Therefore, it is possible to realize the slim scalar type robot 201.

FIG. 13 is a schematic diagram showing the configuration of a six-axis vertical multi-joint type robot 202 according to this embodiment. In other words, FIG. 13 is a schematic diagram of the six-axis vertical multi-joint type robot 202 applied with the invention.

A J1 axis actuator 171, a J2 axis actuator 172, a J3 axis actuator 173, a J4 axis actuator 174, a J5 axis actuator 175, a J6 axis actuator 176, and an end effector 170 are sequentially arranged from a manipulator main body. The J1 axis actuator 171, the J4 axis actuator 174, and the J6 axis actuator 176 are arranged in directions in which joints are twisted. The J2 axis actuator 172, the J3 axis actuator 173, and the J5 axis actuator 175 are arranged in directions in which the joints are bent.

According to this embodiment, the diameter of the joints to be twisted can be reduced. Therefore, it is possible to configure the slim six-axis vertical multi-joint type robot 202. Further, the diameter and the width of the joints to be bent can be reduced. Therefore, it is possible to configure the six-axis vertical multi-joint type robot 202 that prevents interference between links and has a wide operation range.

FIG. 14 is a schematic diagram showing the configuration of a double-arm seven-axis vertical multi-joint type robot 203 according to this embodiment. In other words, FIG. 14 is a schematic diagram of the double-arm seven-axis vertical multi-joint type robot 203 applied with the invention.

In a right arm, a J1 axis actuator 181, a J2 axis actuator 182, a J3 axis actuator 183, a J4 axis actuator 184, a J5 axis actuator 185, a J6 axis actuator 186, a J7 axis actuator 187, and an end effector 180 are sequentially arranged from a manipulator main body. In a left arm, a J1 axis actuator 191, a J2 axis actuator 192, a J3 axis actuator 193, a J4 axis actuator 194, a J5 axis actuator 195, a J6 axis actuator 196, a J7 axis actuator 197, and an end effector 190 are sequentially arranged from the manipulator main body. The J1 axis actuators 181 and 191, the J3 axis actuators 183 and 193, the J5 axis actuators 185 and 195, and the J7 axis actuators 187 and 197 are arranged in directions in which joints are twisted. The J2 axis actuators 182 and 192, the J4 axis actuators 184 and 194, and the J6 axis actuators 186 and 196 are arranged in directions in which the joints are bent.

According to this embodiment, the diameter of the joints to be twisted can be reduced. Therefore, it is possible to configure the slim double-arm seven-axis vertical multi-joint type robot 203. Further, the diameter and the width of the joints to be bent can be reduced. Therefore, it is possible to configure the double-arm seven-axis vertical multi-joint type robot 203 that prevents interference between links and has a wide operation range.

Embodiments concerning an arrangement method for wire bodies are explained.

Second Embodiment 2

Figure 15A:
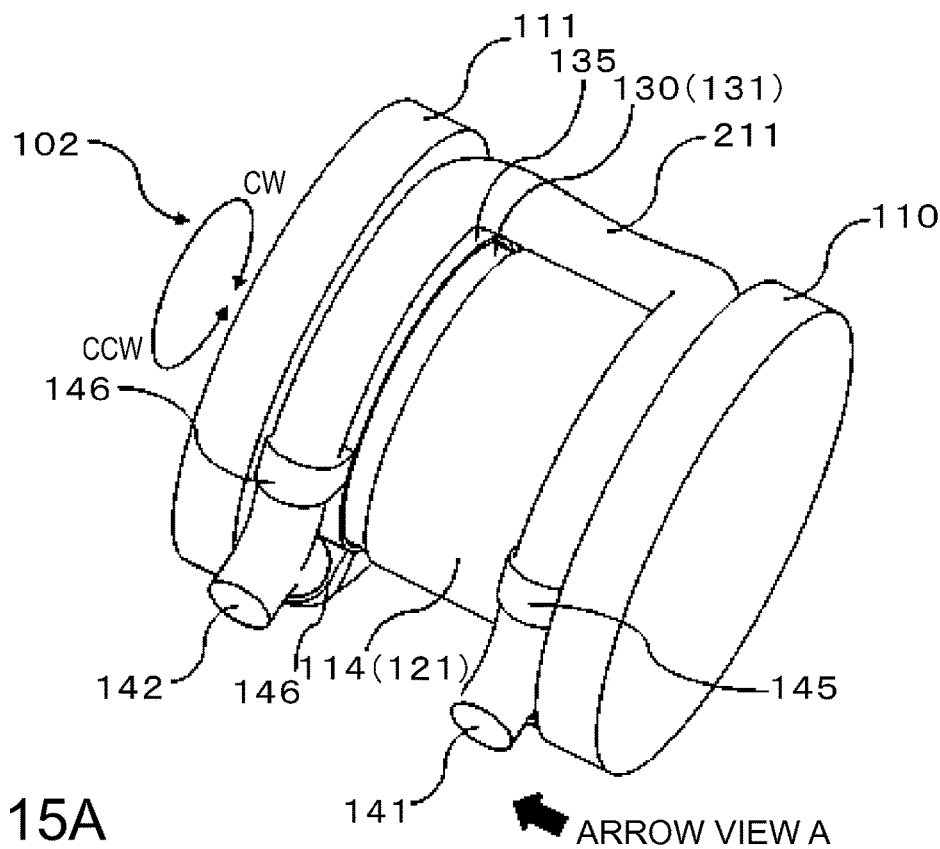
FIGS. 15A and 15B are a perspective view and a sectional view showing an inside in a state in which a cylindrical outer cylinder is removed in an actuator in which wire bodies are arranged to be opposed to each other according to a second embodiment 2.
Figure 15B:
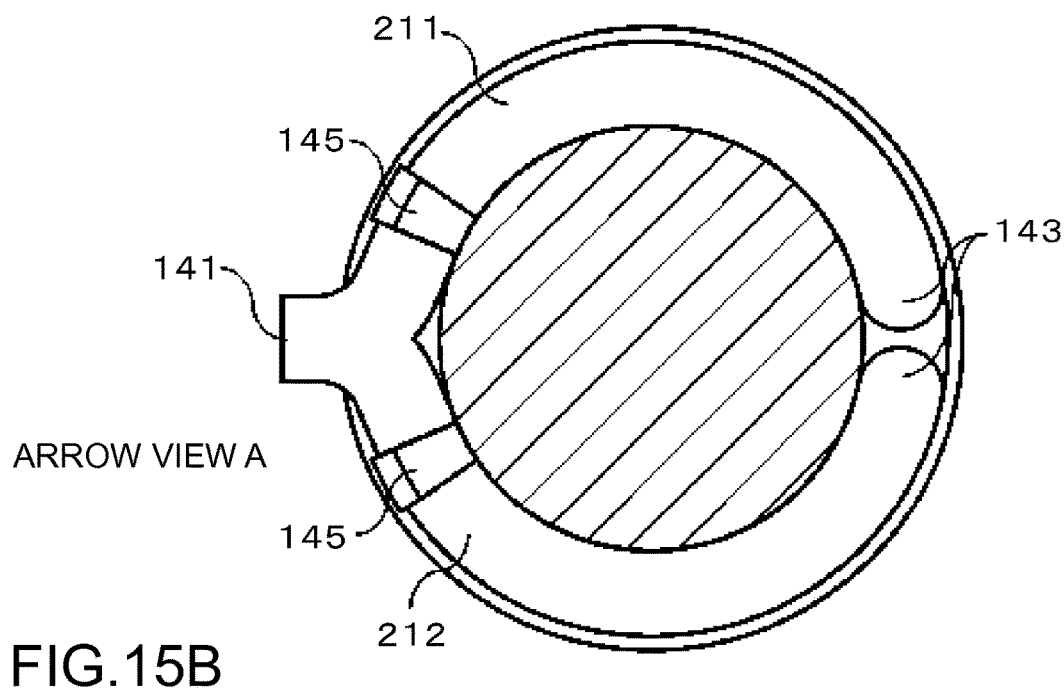

FIGS. 15A and 15B are a perspective view and a sectional view showing an inside in a state in which a cylindrical outer cylinder is removed in an actuator 102 in which wire bodies are arranged to be opposed to each other according to this embodiment.

The actuator 102 according to this embodiment includes, as shown in FIGS. 15A and 15B, a first wire body 211 and a second wire body 212. Fixed sections of the first wire body 211 and the second wire body 212 are arranged to be opposed to each other. Wire body movable sections 143 of the first wire body 211 and the second wire body 212 are arranged to be folded back. As shown in FIG. 15B, the first wire body 211 and the second wire body 212 are arranged in a range in which U-shaped sections do not overlap a region where the outer circumferences of the transmission shaft 114, the reduction gear frame 131, and the reduction gear output shaft 133 are divided into two.

According to this embodiment, the thickness of the wire bodies can be reduced by providing the wire bodies in two systems, increasing the numbers of wires and pipes to a double, and dividing the wires and the pipes into two systems. Therefore, it is possible to reduce spaces for the wires and the pipes and configure compact joints.

FIGS. 16A to 16E are schematic diagrams showing motions of the wire bodies of the actuator 102 according to this embodiment. In other words, FIGS. 16A to 16E are schematic diagrams showing deformation of the first wire body 211 and the second wire body 212 involved in the turn of the turning link 111 with respect to the base point link 110 according to this embodiment. A relation between the turn of the turning link 111 with respect to the base point link 110 and the movement of the U-shaped bent sections of the first wire body 211 and the second wire body 212 is explained with reference to the figures.

Figure 16A:
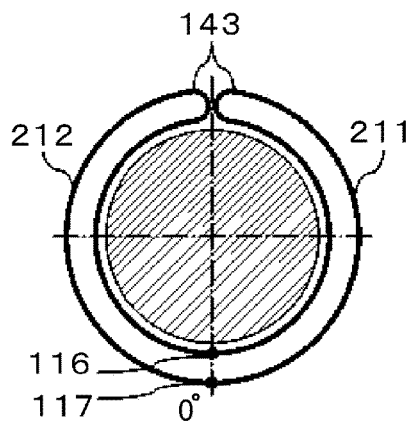
FIGS. 16A to 16E are schematic diagrams showing movements of the wire body of the actuator according to the second embodiment 2.

FIG. 16A shows a reference position where the base point link wire body extraction port 116 and the turning link wire body extraction port 117 are in the same circumferential direction of the actuator 102. An angle formed by the base point link 110 and the turning link 111 is 0 degree. In this case, the U-shaped section of the first wire body 211 and the U-shaped section of the second wire body 212 are arranged in positions opposed to each other.

Figure 16B:
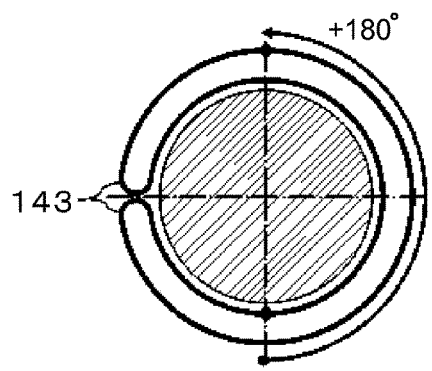

FIG. 16B shows deformation of the first wire body 211 and the second wire body 212 at the time when the turning link 111 turns +180 degrees with respect to the base point link 110. The U-shaped sections of the first wire body 211 and the second wire body 212 move while keeping the opposed positional relation. The position of the U-shaped bent section of the wire body movable section 143 moves at a half angle with respect to the turning angle of the turning link 111 because the wire bodies are folded back in the U shape. In this case, the U-shaped bent sections move to a position of 270 degrees (=initial position 180+moving amount 180/2).

Figure 16D:
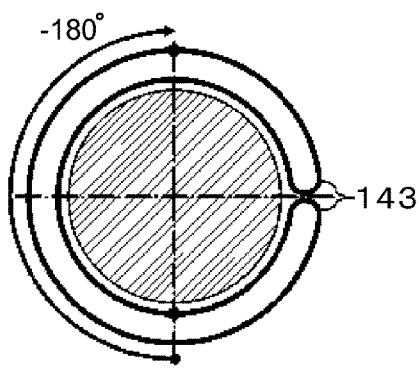
Figure 16C:
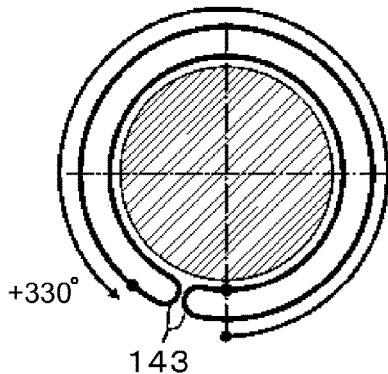

FIG. 16C shows deformation of the first wire body 211 and the second wire body 212 at the time when the turning link 111 turns +330 degrees with respect to the base point link 110. In this case, the U-shaped bent sections move to a position of 345 degrees (=initial position 180+moving amount 330/2).

FIG. 16D shows deformation of the first wire body 211 and the second wire body 212 at the time when the turning link 111 turns −180 degrees with respect to the base point link 110. In this case, the U-shaped bent sections move to a position of 90 degrees (=initial position 180−moving amount 180/2).

Figure 16E:
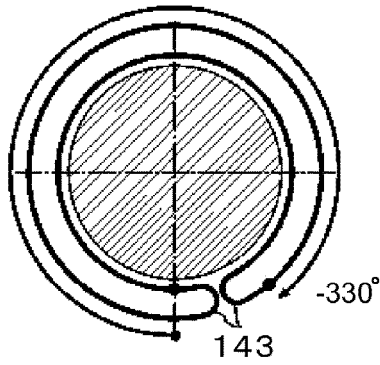

FIG. 16E shows deformation of the first wire body 211 and the second wire body 212 at the time when the turning link 111 turns −330 degrees with respect to the base point link 110. In this case, the U-shaped bent sections move to a position of 15 degrees (=initial position 180−moving amount 330/2).

An angle range in which the turning link 111 can turn with respect to the base point link 110 is a range in which the U-shaped bent sections climb over neither the base point link fixed wire body 141 nor the turning link fixed wire body 142 in both the plus and the minus direction. According to this condition, ideally, the turning link 111 can turns ±360 degrees with respect to the base point link 110.

Second Embodiment 3

Figure 17A:
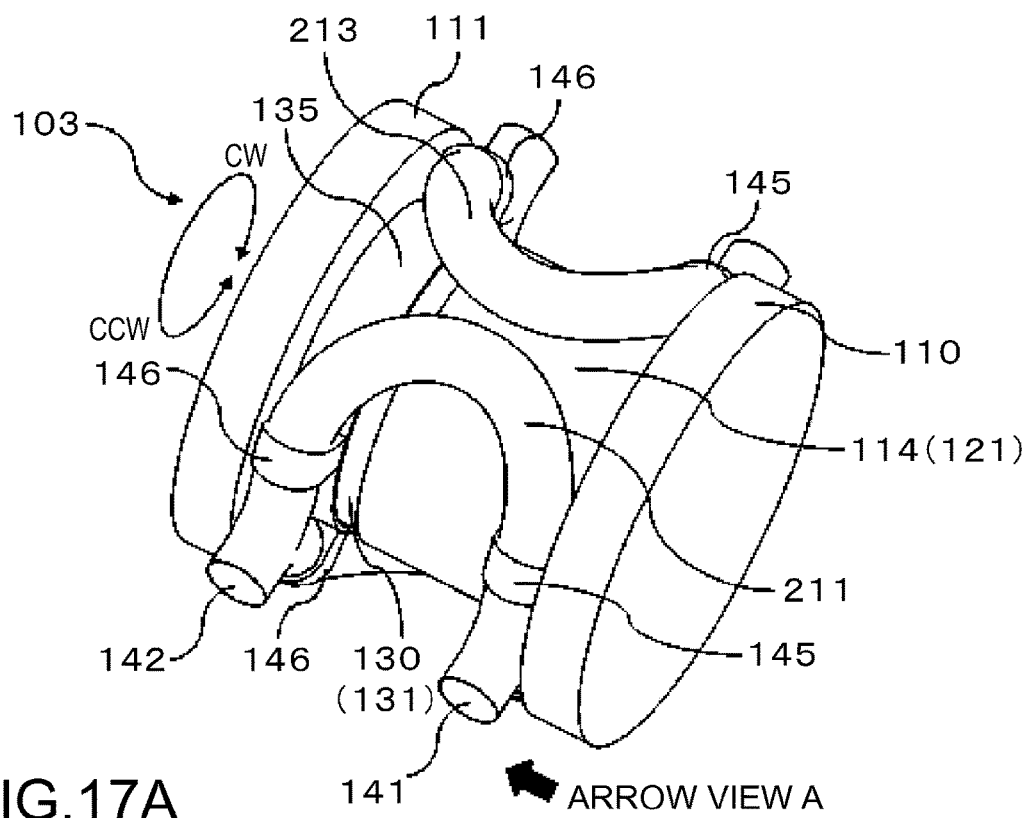
FIGS. 17A and 17B are a perspective view and a sectional view showing an inside in a state in which a cylindrical outer cylinder is removed in an actuator in which a plurality of wire bodies are arranged in the circumferential direction according to a second embodiment 3.
Figure 17B:
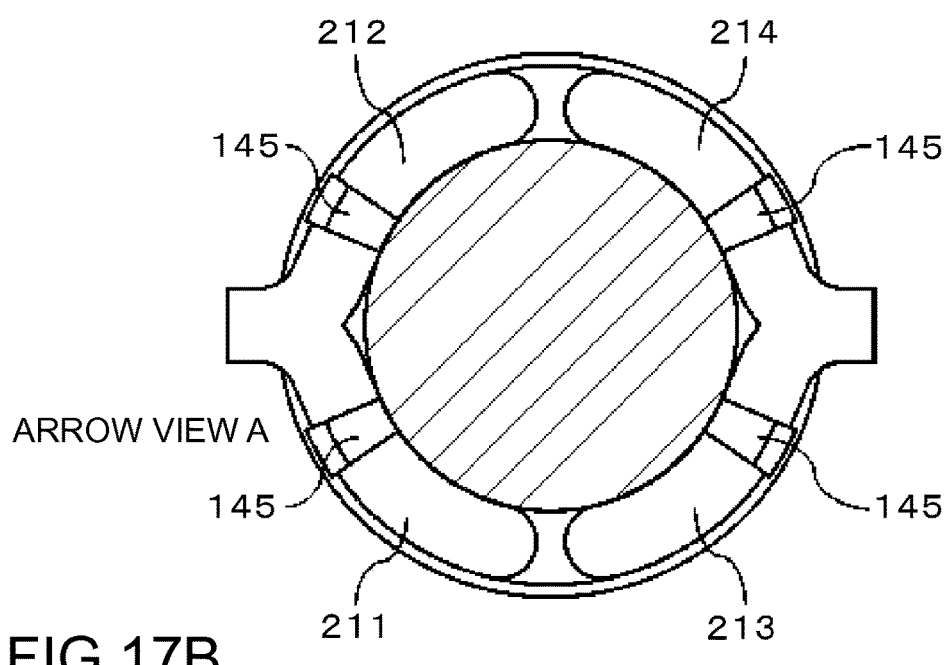

FIGS. 17A and 17B are a perspective view and a sectional view showing an inside in a state in which a cylindrical outer cylinder is removed in an actuator 103 in which a plurality of wire bodies are arranged in the circumferential direction according to this embodiment.

The actuator 103 according to this embodiment includes, as shown in FIGS. 17A and 17B, the first wire body 211, the second wire body 212, a third wire body 213, and a fourth wire body 214. The fixed sections of the first wire body 211 and the second wire body 212 are arranged to be opposed to each other. Fixed sections of the third wire body 213 and the fourth wire body 214 are arranged to be opposed to each other. The wire body movable sections 143 of the wire bodies are folded back in a U shape. The outer circumferences of the transmission shaft 114, the reduction gear frame 131, and the reduction gear output shaft 133 are equally divided into two and arranged. As shown in FIG. 17B, the first wire body 211 and the third wire body 213 and the second wire body 212 and the fourth wire body 214 are arranged in ranges in which the U-shaped sections do not overlap the outer circumferences of the transmission shaft 114, the reduction gear frame 131, and the reduction gear output shaft 133.

According to this embodiment, the thickness of the wire bodies can be reduced by providing the wire bodies in four systems, increasing the numbers of wires and pipes to a quadruple, and dividing the wires and the pipes into four systems. Therefore, it is possible to reduce spaces for the wires and the pipes and configure compact joints. In this embodiment, as a turning range of the turning link 111 with respect to the base point link 110, ideally, ±180 degrees can be secured. Further, the numbers of the wires and the pipes can be increased by equally dividing the outer circumferences of the transmission shaft 114, the reduction gear frame 131, and the reduction gear output shaft 133 into n and arranging the wires and the pipes in n×2 systems. Therefore, it is possible to house necessary wire bodies.

Note that, in this embodiment, the first wire body 211 and the second wire body 212 are arranged to be opposed to each other and the third wire body 213 and the fourth wire body 214 are arranged to be opposed to each other. However, only one of the first wire body 211 and the second wire body 212 and one of the third wire body 213 and the fourth wire body 214 may be arranged.

Second Embodiment 4

Figure 18A:
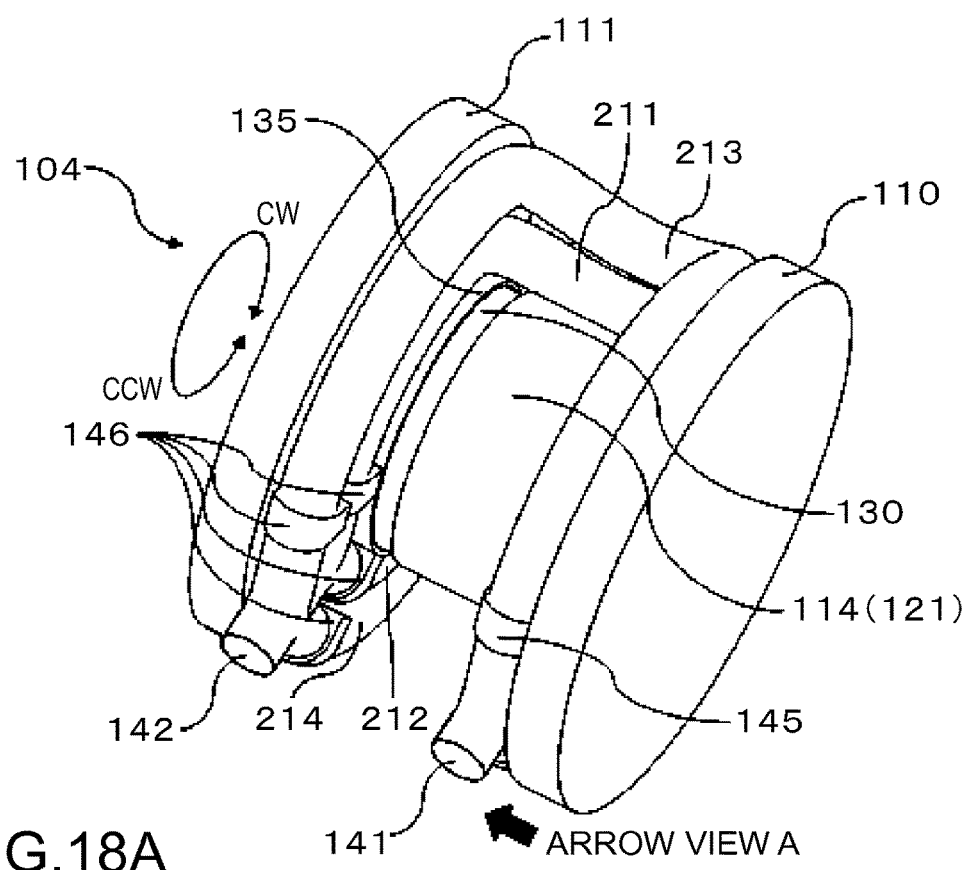
FIGS. 18A and 18B are a perspective view and a sectional view showing an inside in a state in which a cylindrical outer cylinder is removed in an actuator in which a plurality of wire bodies are arranged in the radial direction according to a second embodiment 4.
Figure 18B:
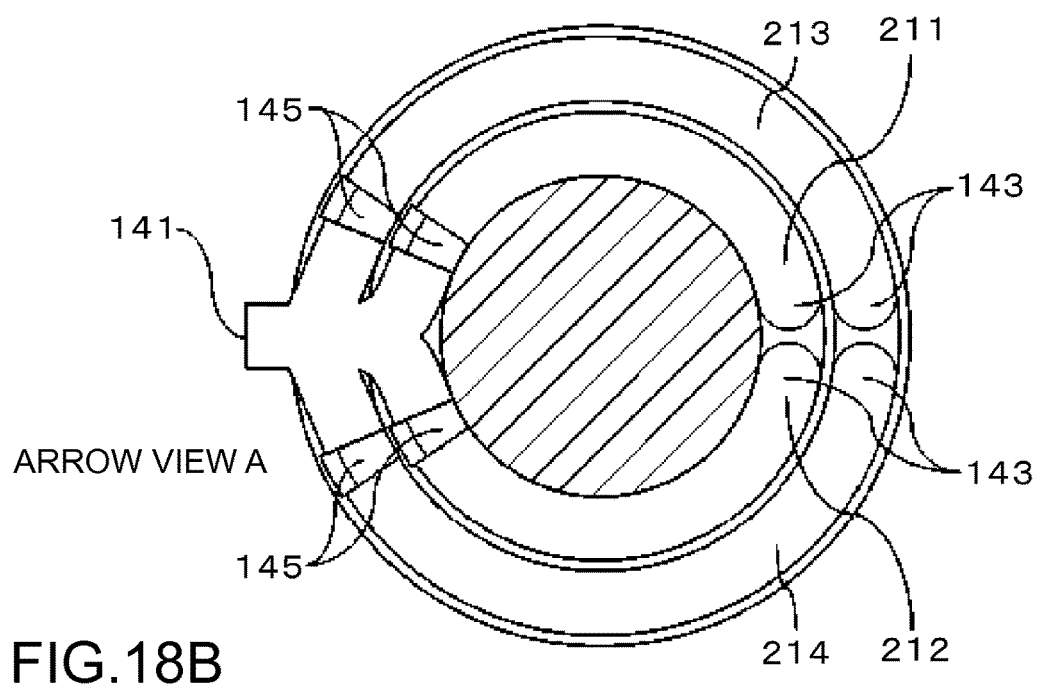

FIGS. 18A and 18B are a perspective view and a sectional view showing an inside in a state in which a cylindrical outer cylinder is removed in an actuator 104 in which a plurality of wire bodies are arranged in the radial direction according to this embodiment.

The actuator 104 according to this embodiment includes, as shown in FIGS. 18A and 18B, the first wire body 211, the second wire body 212, the third wire body 213, and the fourth wire body 214. The fixed sections of the first wire body 211 and the second wire body 212 are arranged to be opposed to each other. The fixed sections of the third wire body 213 and the fourth wire body 214 are arranged to be opposed to each other. The wire body movable sections 143 of the wire bodies are folded back in a U shape. As shown in FIG. 18B, the first wire body 211 and the second wire body 212 are arranged in a range in which the U-shaped sections do not overlap the outer circumferences of the transmission shaft 114, the reduction gear frame 131, and the reduction gear output shaft 133. Further, the third wire body 213 and the fourth wire body 214 are arranged in a range in which the U-shaped portions do not overlap the outer circumferences.

According to this embodiment, the thickness of the wire bodies can be reduced by providing the wire bodies in four systems, increasing the numbers of wires and pipes to a quadruple, and dividing the wires and the pipes into four systems. Therefore, it is possible to reduce spaces for the wires and the pipes and configure compact joints. In this embodiment, as a turning range of the turning link 111 with respect to the base point link 110, ideally, ±180 degrees can be secured. Further, the numbers of the wires and the pipes can be increased by arranging the wires and the pipes in the outer circumference direction of the transmission shaft 114, the reduction gear frame 131, and the reduction gear output shaft 133. Therefore, it is possible to house necessary wire bodies.

Note that, in this embodiment, the first wire body 211 and the second wire body 212 are arranged to be opposed to each other and the third wire body 213 and the fourth wire body 214 are arranged to be opposed to each other. However, only one of the first wire body 211 and the second wire body 212 and one of the third wire body 213 and the fourth wire body 214 may be arranged.

Second Embodiment 5

Figure 19A:
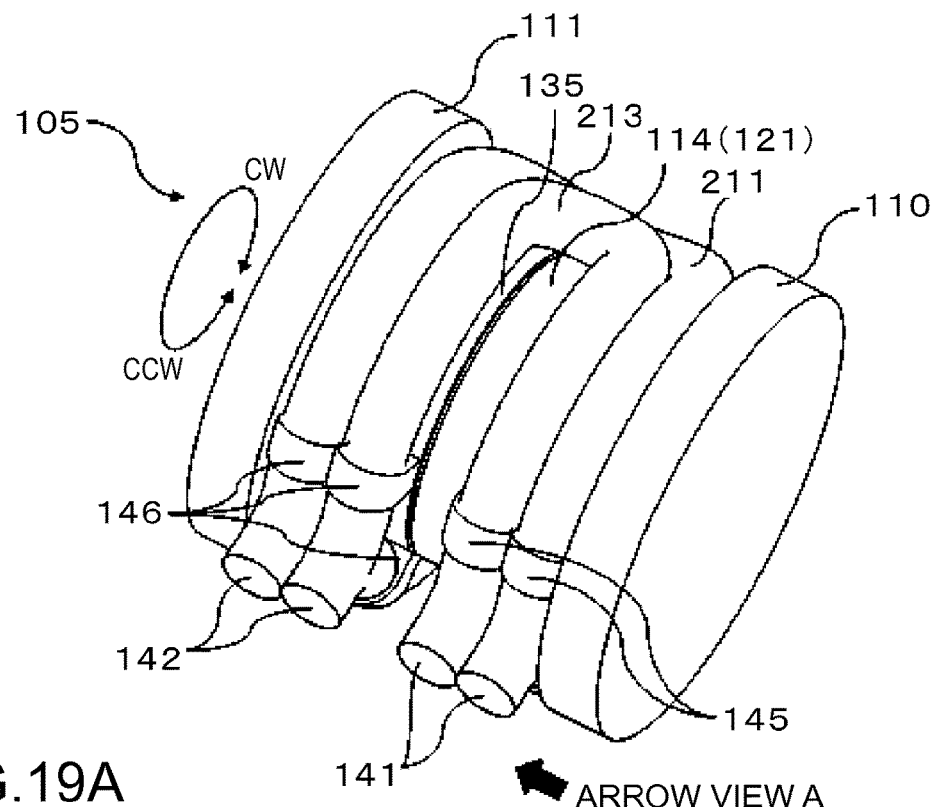
FIGS. 19A and 19B are a perspective view and a sectional view showing an inside in a state in which a cylindrical outer cylinder is removed in an actuator in which a plurality of wire bodies are arranged in the axial direction according to a second embodiment 5.
Figure 19B:
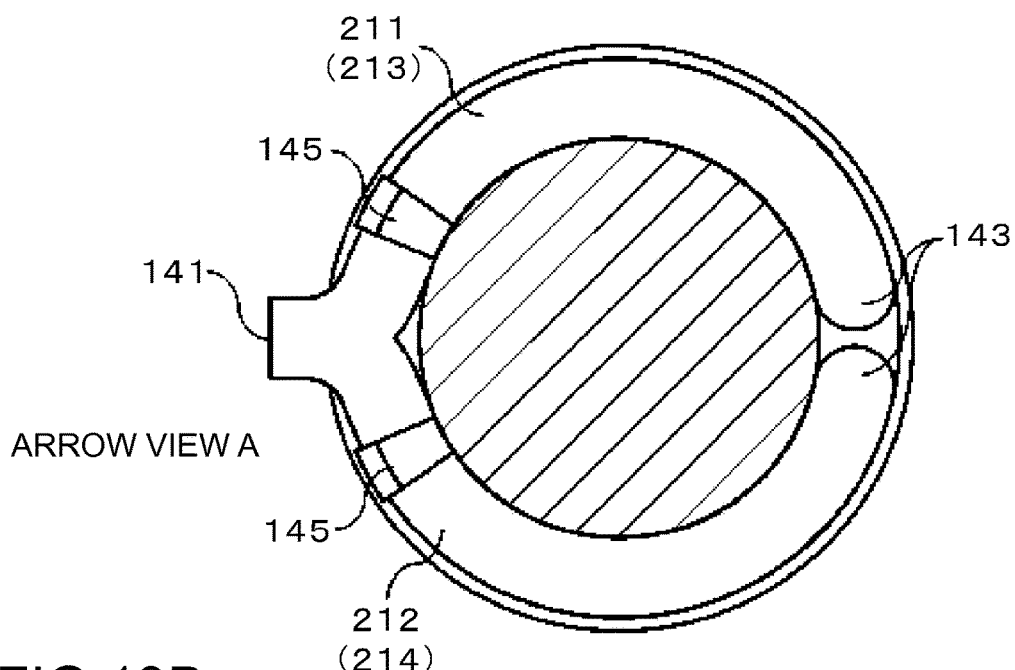

FIGS. 19A and 19B are a perspective view and a sectional view showing an inside in a state in which a cylindrical outer cylinder is removed in an actuator 105 in which a plurality of wire bodies are arranged in the axial direction according to this embodiment.

The actuator 105 according to this embodiment includes, as shown in FIGS. 19A and 19B, the first wire body 211, the second wire body 212, the third wire body 213, and the fourth wire body 214. The fixed sections of the first wire body 211 and the second wire body 212 are arranged to be opposed to each other. The fixed sections of the third wire body 213 and the fourth wire body 214 are arranged to be opposed to each other. The wire body movable sections 143 of the wire bodies are folded back in a U shape. As shown in FIG. 19B, the first wire body 211 and the second wire body 212 are arranged in a range in which the U-shaped sections do not overlap the outer circumferences of the transmission shaft 114, the reduction gear frame 131, and the reduction gear output shaft 133. Further, the third wire body 213 and the fourth wire body 214 are arranged in a range in which the U-shaped portions do not overlap the inner side of the U-shaped folded-back arrangement of the first wire body 211 and the second wire body 212.

According to this embodiment, the thickness of the wire bodies can be reduced by providing the wire bodies in four systems, increasing the numbers of wires and pipes to a quadruple, and dividing the wires and the pipes into four systems. Therefore, it is possible to reduce spaces for the wires and the pipes and configure compact joints. In this embodiment, as a turning range of the turning link 111 with respect to the base point link 110, ideally, ±180 degrees can be secured. Further, the numbers of the wires and the pipes can be increased by arranging the wires and the pipes in the axial direction of the transmission shaft 114, the reduction gear frame 131, and the reduction gear output shaft 133. Therefore, it is possible to house necessary wire bodies.

Note that, in this embodiment, the first wire body 211 and the second wire body 212 are arranged to be opposed to each other and the third wire body 213 and the fourth wire body 214 are arranged to be opposed to each other. However, only one of the first wire body 211 and the second wire body 212 and one of the third wire body 213 and the fourth wire body 214 may be arranged.

The second embodiment 1 to the second embodiment 5 can be applied in common to turning sections of machine apparatuses. Besides the joints of the robots 201, 202, and 203, the embodiments can be used for machine apparatuses involving turning motions and incorporating the wire bodies 211, 212, 213, and 214. A turning driving unit incorporating the wire bodies 211, 212, 213, and 214 can be configured by integrating a reduction gear and a motor and applying the embodiments to the reduction gear and the motor.

Application Example 8-1

A joint driving device in this application example is a joint driving device in which a first link and a second link relatively turn. The joint driving device includes: a motor including a rotor, a rotor shaft, a stator, a motor frame, and a bearing that supports the rotor shaft; a reduction gear that decelerates rotation from the motor and increases and outputs a torque output of the turning; a reduction gear output shaft that transmits the torque output from the reduction gear to the second link; a transmission shaft that transmits reaction of the torque output from a frame of the reduction gear to the first link; a transmission shaft outer cylinder arranged on the outer circumference of the transmission shaft and connected to the transmission shaft; a reduction gear output shaft outer cylinder arranged in the outer circumference of the reduction gear output shaft and connected to the reduction gear output shaft; and a wire body arranged between the first link and the second link and including at least one of a wire and a pipe. The transmission shaft includes the motor frame as at least a part. The wire body is housed in a housing space formed by a space between the transmission shaft outer cylinder and the transmission shaft, the frame of the reduction gear, or the reduction gear output shaft and a space between the reduction gear output shaft outer cylinder and the reduction gear output shaft, the frame of the reduction gear, or the transmission shaft.

According to this application example, in the structure of the joint driving device that turns the first link and the second link with respect to each other, the motor frame is used as a part of the transmission shaft. Therefore, it is possible to simplify the structure and reduce the outer diameter of the joint driving device. With this structure, the space for housing the wire body is provided in the outer circumference of the reduction gear output shaft, the frame of the reduction gear, or the transmission shaft to secure a bending radius of the wire body large. Consequently, it is possible to reduce deformation stress acting on the wire body. It is possible to provide the joint driving device that improves the durability of the wire body.

Application Example 8-2

The joint driving device described in the application example 8-1 further includes a reduction gear output shaft collar connected to the reduction gear output shaft and arranged in the outer circumference of the frame of the reduction gear or the transmission shaft.

According to this application example, in an area where the reduction gear output shaft turns, the wire body moves following the reduction gear output shaft outer cylinder and, on the other hand, the frame of the reduction gear and the transmission shaft turn in a direction opposite to the turn of the reduction gear output shaft outer cylinder. Therefore, relative motions of the frame of the reduction gear and the transmission shaft and the wire body occur and friction tends to occur. However, the reduction gear output shaft collar prevents the wire body from coming into contact with the frame of the reduction gear and the transmission shaft and prevents the occurrence of friction with the wire body. Therefore, the durability of the wire body is improved.

Application Example 8-3

In the joint driving device described in the application example 8-1, the wire body includes a movable section and fixed sections located at both ends of the movable section. One of the fixed sections of the wire body is arranged along the circumferential direction of the transmission shaft between the transmission shaft outer cylinder and the transmission shaft. The other of the fixed sections of the wire body is arranged along the circumferential direction of the reduction gear output shaft between the reduction gear output shaft outer cylinder and the frame of the reduction gear or the transmission shaft. The movable section of the wire body is arranged to be folded back in a U shape in the circumferential direction of the transmission shaft and the reduction gear output shaft.

According to this application example, when the first link and the second link turn with respect to each other, the U-shaped folded-back section moves. Consequently, it is possible to disperse bending stress acting on the wire body to the entire wire body. It is possible to secure the durability of the wire body.

Application Example 8-4

In the joint driving device described in the application example 8-3, one of the fixed sections of the wire body is fixed to be closer to the transmission shaft side and the other of the fixed sections of the wire body is fixed to be closer to the reduction gear output shaft outer cylinder side.

According to this application example, fixing positions of the fixed sections of the wire body are arranged to be shifted in the radial direction of the transmission shaft. Therefore, it is possible to reduce contact pressures of the wire body and the frame of the reduction gear, the reduction gear output shaft, the reduction gear output shaft outer cylinder, the transmission shaft, and the transmission shaft outer cylinder and prevent friction. Therefore, it is possible to improve the durability of the wire body.

Application Example 8-5

In the joint driving device described in the application example 8-1, the wire body includes a first wire body and a second wire body. Fixed sections of the first wire body and the second wire body are arranged to be opposed to each other. The wire bodies are arranged in a range in which U-shaped folded-back sections of the wire bodies do not overlap.

According to this application example, the thickness of the wire bodies can be reduced by providing the wire bodies in two systems, increasing the numbers of wires and pipes to a double, and dividing the wires and the pipes into two systems. Therefore, it is possible to reduce housing spaces for the wires and the pipes and configure compact joints.

Application Example 8-6

In the joint driving device described in the application example 8-1, a plurality of systems of the wire bodies are arranged along the circumferential direction of the transmission shaft and the reduction gear output shaft.

According to this application example, the numbers of the wires and the pipes can be increased by arranging the plurality of systems of the wire bodies. Therefore, it is possible to house necessary wire bodies.

Application Example 8-7

In the joint driving device described in the application example 8-1, a plurality of systems of the wire bodies are arranged along the radial direction of the transmission shaft and the reduction gear output shaft.

According to this application example, the numbers of the wires and the pipes can be increased by arranging the plurality of systems of the wire bodies. Therefore, it is possible to house necessary wire bodies.

Application Example 8-8

In the joint driving device described in the application example 8-1, a plurality of systems of the wire bodies are arranged along the axial direction of the transmission shaft and the reduction gear output shaft.

According to this application example, the numbers of the wires and the pipes can be increased by arranging the plurality of systems of the wire bodies. Therefore, it is possible to house necessary wire bodies.

Application Example 8-9

The joint driving device described in the application example 8-1 further includes a mechanical brake. The mechanical brake is arranged in a space on the inside of the first link or the second link.

According to this application example, the mechanical brake can be arranged using the space on the inside of the first link or the second link. Therefore, it is possible to reduce the width in a turning axis direction of the joint driving device. It is possible to reduce the joint driving device in size.

Application Example 8-10

The joint driving device described in the application example 8-1 further includes a position detector. The position detector is arranged in a space on the inside of the first link or the second link.

According to this application example, the position detector can be arranged using the space on the inside of the first link or the second link. Therefore, it is possible to reduce the width in the turning axis direction of the joint driving device. It is possible to reduce the joint driving device in size.

Application Example 8-11

The joint driving device described in the application example 8-1 further includes a motor driving circuit and a position detector processing circuit. The motor driving circuit and the position detector processing circuit are arranged in the first link or the second link.

According to this application example, the motor and the motor driving circuit can be arranged close to each other and the position detector and the position detector processing circuit can be arranged closed to each other. Therefore, it is possible to reduce a wire between the motor and the motor driving circuit and a wire between the position detector and the position detector processing circuit. It is possible to reduce the joint driving device in size.

Application Example 8-12

In the joint driving device described in the application example 8-1, the stator of the motor is shrunk-fit or pressed-fit in the motor frame.

According to this application example, by shrink-fitting or press-fitting the stator, it is possible to reduce components for fixing the stator to the motor frame, reduce the joint driving device in size, and reduce costs.

Application Example 8-13

In the joint driving device described in the application example 8-1, the wire body is connected to a circuit board or a connector in the housing space or the reduction gear output shaft outer cylinder and the transmission shaft outer cylinder.

According to this application example, the wire body can be relayed or divided in the housing space or the reduction gear output shaft outer cylinder and the transmission shaft outer cylinder. Therefore, workability of assembly and disassembly is improved.

Application Example 8-14

A robot according to this application example includes the joint driving device described in any one of the above application examples.

According to this application example, in a vertical multi-joint type robot or a scalar type robot in which an arm is configured by sequentially connecting links with turning joints, it is possible to house the wire body in the arm, reduce deformation of bending and twisting of the wire body, prevent breaking of wire and breakage, and extend the life of the robot. Since the wire body can be compactly housed in a joint, it is possible to configure a robot arm that is small in size and light in weight and has a wide movable range. Further, since the wire body can be wound around a shaft and arranged after a machine body is assembled, it is possible to realize a robot that is easily assembled and in which the wire body is easily added and replaced. Further, since it is easy to house the wire body in the arm and form a waterproof and dustproof structure, it is possible to realize a robot of waterproof and dustproof specifications. Consequently, it is possible to provide a small, light, and low-cost robot.

Application Example 8-15

In the robot described in the application example 8-14, the second link of the joint driving device turns in a direction in which the joint is bent with respect to the first link.

According to this application example, since the width of the joint that connects the links can be reduced, it is possible to realize a slim arm. Further, since a wide joint operation range can be secured, it is possible to widen a movable range of the robot arm.

Application Example 8-16

In the robot described in the application example 8-14, the second link of the joint driving device turns in a direction in which the joint is twisted with respect to the first link.

According to this application example, since the outer diameter of the robot arm can be reduced, it is possible to suppress interference between the links and widen a movable range of the robot arm.

Third Embodiment 1

The schematic configuration of a robot according to this embodiment is explained.

Figure 20:
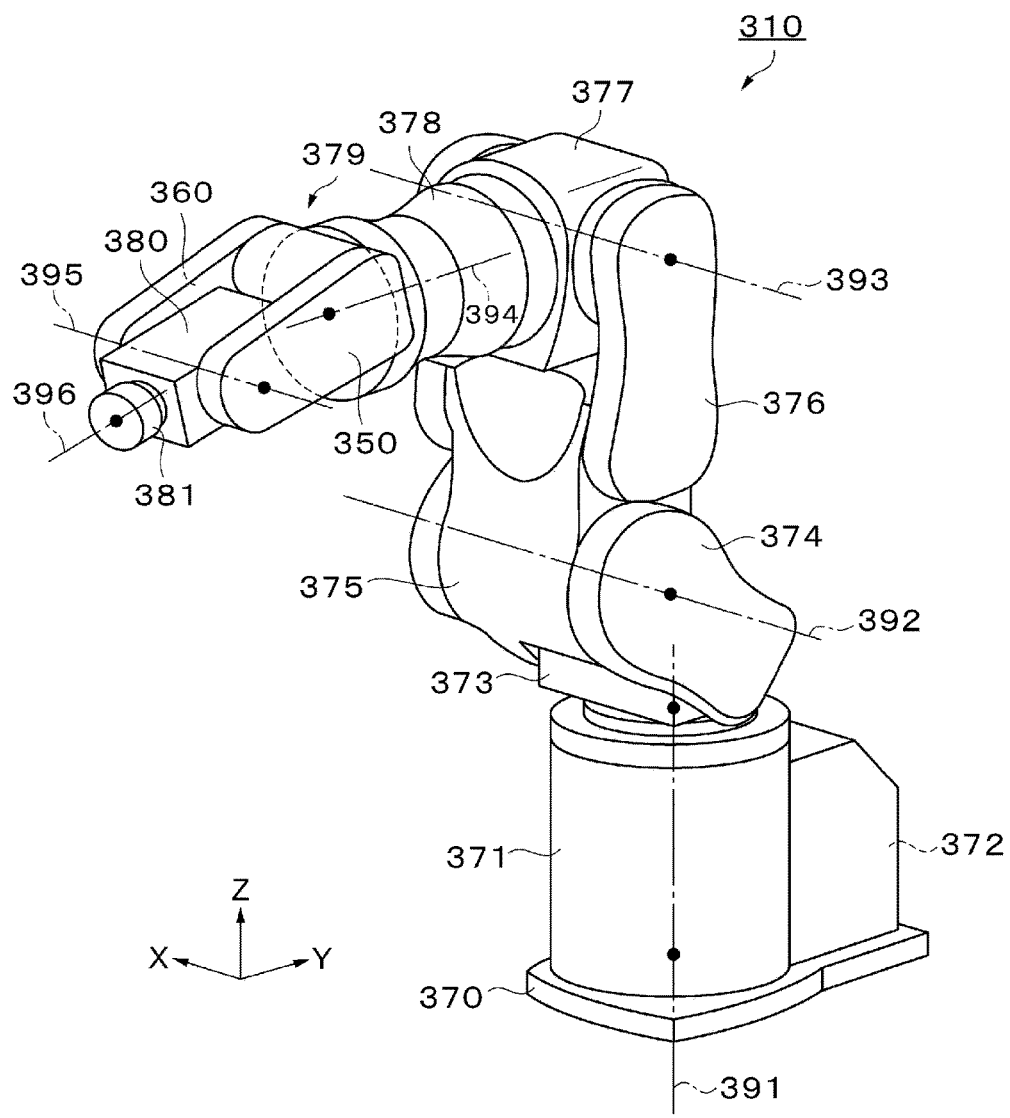
FIG. 20 is a perspective view schematically showing the schematic configuration of a robot according to a third embodiment 1.

FIG. 20 is a perspective view schematically showing the schematic configuration of the robot according to this embodiment. Note that "turn" in this embodiment means a normal turn and a reverse turn.

A robot 310 shown in FIG. 20 is a six-axis vertical type multi-joint robot having 6 turning axes which are fundamental driving axes. A plurality of links (brackets) functioning as arm members are connected in series by a plurality of joints (couplings) functioning as arm members in a height direction (a Z axis) simulating the structure of the human arm. Therefore, it is possible to perform complicated work with a high degree of freedom.

The robot 310 includes a base section 370 and a main body section 371 functioning as a base, a control section 372, a joint 373, a link 374, a joint 375, a link 376, a joint 377, a link 378, a joint 379, a wrist member (link) 380 functioning as arm members, and a hand (link) 381 on which an end effector (not shown in the figure) is mounted. The robot 310 includes a multi-joint arm in which links and/or joints adjacent to each other are turnably coupled by a joint mechanism.

The base section 370 is a pedestal of the robot 310 and is firmly fixed to a plane such as a floor of a work space in a factory or a work bench by a plurality of bolts (screws). Note that a fixing place is not limited to a horizontal plane (a plane including an X axis and a Y axis) and may be on a movable wagon, an arm coupling section provided on a wall surface, a ceiling, a robot unit explained below, or the like as long as the fixing place has strength enough for withstanding the weight and vibration of the robot 310.

In the control section 372, although not shown in the figure, in addition to an operation panel for operating the robot 310, an interface terminal such as an RS232C or USB (Universal Serial Bus) for inputting an operation program is provided. Alternatively, the control section 372 may include an interface device such as a wireless LAN (Local Area Network) or an infrared transceiver.

Note that the control section 372 may be provided separately from a robot main body.

The joint 373 and the link 374 are arranged in this order on the main body section 371.

First, a multi-joint arm structure from the joint 373 to the wrist member 380 of the robot 310 (from an arm to a hand) turns in the horizontal direction about a first turning axis 391 that pierces through the main body section 371 in the Z-axis direction. That is, the joint 373 performs a twisting motion of turning in a twisting direction around the first turning axis with respect to the main body section 371.

The hand 381, on which the end effector is mounted, is one end (an end) in the multi-joint arm structure. The joint 373 attached to the main body section 371 (on the base section 370 side) is equivalent to the other end (a base) in the robot arm structure. Note that, in the following explanation, a side close to the hand 381 in the robot arm structure is also referred to as "end side" and a side close to the base section 370 is also referred to as "base side".

A motor for driving to rotate the robot arm structure, a deceleration mechanism including a plurality of gears, and the like are incorporated in the main body section 371. Motors for driving the links and the end effector corresponding thereto, a deceleration mechanism, and the like are also incorporated near turning axes explained below.

The joint 375 is combined with the end side of the link 374 arranged to extend to the end side of the joint 373. The joint 375 is driven to turn about a flexing turning axis substantially orthogonal to the first turning axis 391, i.e., a first flexing turning axis 392 that pierces through the link 374 in the X-axis direction. The first flexing turning axis 392 is located on the end side of the link 374. "Substantially orthogonal" is defined as including crossing in a range within 10° in addition to completely orthogonal.

Note that, in the multi-joint arm in this embodiment, flexing turning axes substantially parallel to the first flexing turning axis 392 are named by serial numbers such as first to n-th flexing turning axes from the main body side. "Substantially parallel" is defined as including crossing in a range within 10° in addition to completely parallel.

Extending directions of the turning axes change when the robot operates (e.g., when the robot turns (twists) about the first turning axes 391). Therefore, the following explanation is based on a state in which the robot is set in an initial state shown in FIG. 20.

The link 376 is arranged to extend to the end side of the joint 375.

The joint 377 is combined with the end side of the link 376. The link 378 is combined with the end side of the joint 377. The link 378 is arranged to extend to the end side of the joint 377. The joint 377 combined with the link 378 is driven about a second flexing turning axis 393 that pierces through the end side of the link 376 in the X-axis direction.

The joint 379, on which a driving transmitting section 350 and an electric section 360 are set, is combined with the end side of the link 378. The joint 379 is driven to turn in a twisting direction with respect to the link 378 about a twisting turning axis 394 that pierces through the end side of the link 378 in the Y-axis direction.

The wrist member 380 is combined with the end side of the joint 379. The wrist member 380 is driven about a third flexing turning axis 395 that pierces through the end side of the joint 379 in the X-axis direction.

The hand 381 is arranged to extend to the wrist member 380 on the end side of the wrist member 380. The hand 381 is driven to turn in the Y-axis direction along the extending direction of the hand 381 from the wrist member 380 on the end side of the wrist member 380, that is, turn in a twisting direction with respect to the wrist member 380 about a twisting turning axis 396 that pierces through substantially the center of the hand 381 formed in a columnar shape.

As explained above, the end effector functioning as a mechanism for executing predetermined work performed by the robot 310 is combined on the end side of the multi-joint arm (not shown in the figure). As the end effector, end effectors of various forms can be used according to applications of the robot 310. For example, a gripping mechanism such as a robot hand that grips a manufactured article or the like or a tool for performing machining such as soldering or welding is attached to the end side of the hand 381, whereby the robot 310 can be used as the robot 310 that carries out various kinds of work.

Among the joint driving mechanisms of the multi-joint arm of the robot 310 configured as explained above, an example of the joint driving mechanisms that turnably couple the arm members (the links or the joints) adjacent to each other excluding the joint driving mechanism for the wrist member 380 and the hand 381 is explained.

Figure 21:
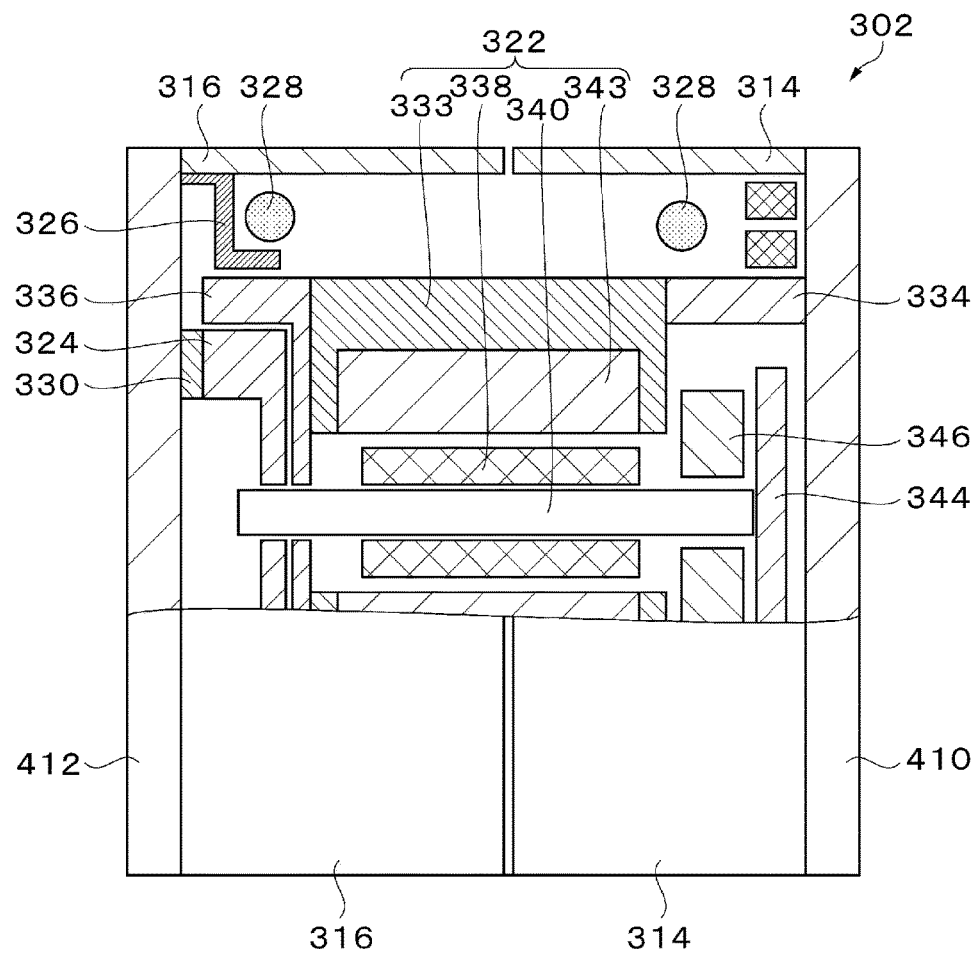
FIG. 21 is a partial sectional view schematically showing a front structure of an actuator as an example of a joint driving mechanism of the robot according to the third embodiment 1.

First, a joint driving mechanism for a turning axis (a joint) different from the third flexing turning axis 395, which is the flexing turning axis at the most end of the multi-joint arm, is explained with reference to the drawings. FIG. 21 is a partial sectional view schematically showing a front structure of an actuator 302 functioning as a joint driving mechanism. Note that, in FIG. 21, in the respective joint sections of the multi-joint arm, an arm member (a link or a joint) on the base side is referred to as base point link 410 and an arm member on the end side turned with respect to the base point link 410 is referred to as turning link 412.

In FIG. 21, the actuator 302 includes a motor 322, a reduction gear 324, a reduction gear output shaft collar 326, a reduction gear output shaft 330, and a transmission shaft 334 including a motor frame 333 of the motor 322 at least as a part.

The motor 322 includes a rotor 338, a rotor shaft 340, a stator 343, and the motor frame 333. The rotor shaft 340 of the motor 322 is connected to an input shaft of the reduction gear 324 on the inside of the reduction gear 324. The stator 343 and the motor frame 333 are provided in the outer circumference of the rotor 338. A turning force of the rotor shaft 340 is transmitted to the reduction gear 324. The reduction gear 324 outputs a torque output obtained by increasing the torque of the turning force.

A frame 336 of the reduction gear 324 is connected to the motor frame 333 of the motor 322 (or the transmission shaft 334). The reduction gear 324 reduces rotation from the motor 322, increases a torque output of the turn, and outputs the torque. The reduction gear 324 incorporates a gear mechanism (not shown in the figure) that decelerates the turn of the input shaft and a joint bearing mechanism (not shown in the figure) that supports the reduction gear output shaft 330. As the gear mechanism of the reduction gear 324, a wave gear may be used. However, other deceleration mechanisms may be used.

The reduction gear output shaft collar 326 is connected to the reduction gear output shaft 330 and arranged in the outer circumference of the reduction gear 324 or the transmission shaft 334. The reduction gear output shaft collar 326 prevents a wire body 328 from coming into contact with the reduction gear 324. The wire body 328 is at least one of a wire and a pipe. Note that the wire body is a general term of a power line (an electric wire), a signal line, a gas pipe for supplying gas, a liquid pipe for supplying liquid, and the like. Note that a vacuum pipe is also included in the gas pipe.

The reduction gear output shaft 330 transmits the torque output from the reduction gear 324 to the turning link 412. A reduction gear output shaft outer cylinder 316 connected to the reduction gear output shaft 330 is arranged in the outer circumference of the reduction gear output shaft 330. The turning link 412, the reduction gear output shaft outer cylinder 316, and the reduction gear output shaft collar 326 are connected to the reduction gear output shaft 330. The reduction gear output shaft 330 transmits the increased torque output to the turning link 412. The reduction gear output shaft 330 corresponds to all members that transmit the torque output of the reduction gear 324 to the turning link 412.

The transmission shaft 334 is a member that connects the frame 336 of the reduction gear 324 and the base point link 410. The transmission shaft 334 includes the motor frame 333 as at least a part. For example, the transmission shaft 334 is integral with the motor frame 333. Consequently, high-load driving can be performed because a heat radiation property is improved by the integration. The transmission shaft 334 also functions as the motor frame 333 of the motor 322. The rotor 338, the rotor shaft 340, and the stator 343 configuring the motor 322 are incorporated in the transmission shaft 334. The transmission shaft 334 is connected to the base point link 410. The transmission shaft 334 transmits reaction of the torque output from the frame 336 of the reduction gear 324 to the base point link 410 to thereby turn the turning link 412 and the base point link 410 with respect to each other. A transmission shaft outer cylinder 314 connected to the transmission shaft 334 is arranged in the outer circumference of the transmission shaft 334.

Besides, in the actuator 302, a number-of-turns detecting section (a position detector) 344 and a mechanical brake 346 are provided. However, positions where the number-of-turns detecting section 344 and the mechanical brake 346 are provided may be positions other than the positions shown in the figure.

The number-of-turns detecting section 344 may be arranged on the inside of the base point link 410. Consequently, it is possible to reduce the length between the base point link 410 and the turning link 412 and reduce the actuator 302 functioning as the joint driving mechanism in size. As the number-of-turns detecting section 344, a unit structure may be used or a module structure may be used.

The reduction gear output shaft 330 may be configured in a hollow structure in the center. A rotating shaft of the motor 322 may be connected to an input shaft of the mechanical brake 346 piercing through the hollow structure of the reduction gear output shaft 330. A frame of the mechanical brake 346 may be arranged on the inside of the turning link 412. Consequently, it is possible to reduce the length between the base point link 410 and the turning link 412 and reduce the actuator 302 functioning as the joint driving device in size.

Details of the driving transmitting section 350, which is a joint driving mechanism for driving a flexing turning axis on the most end side, in the multi-joint arm of the robot 310 are explained with reference to the drawings.

Figure 22:
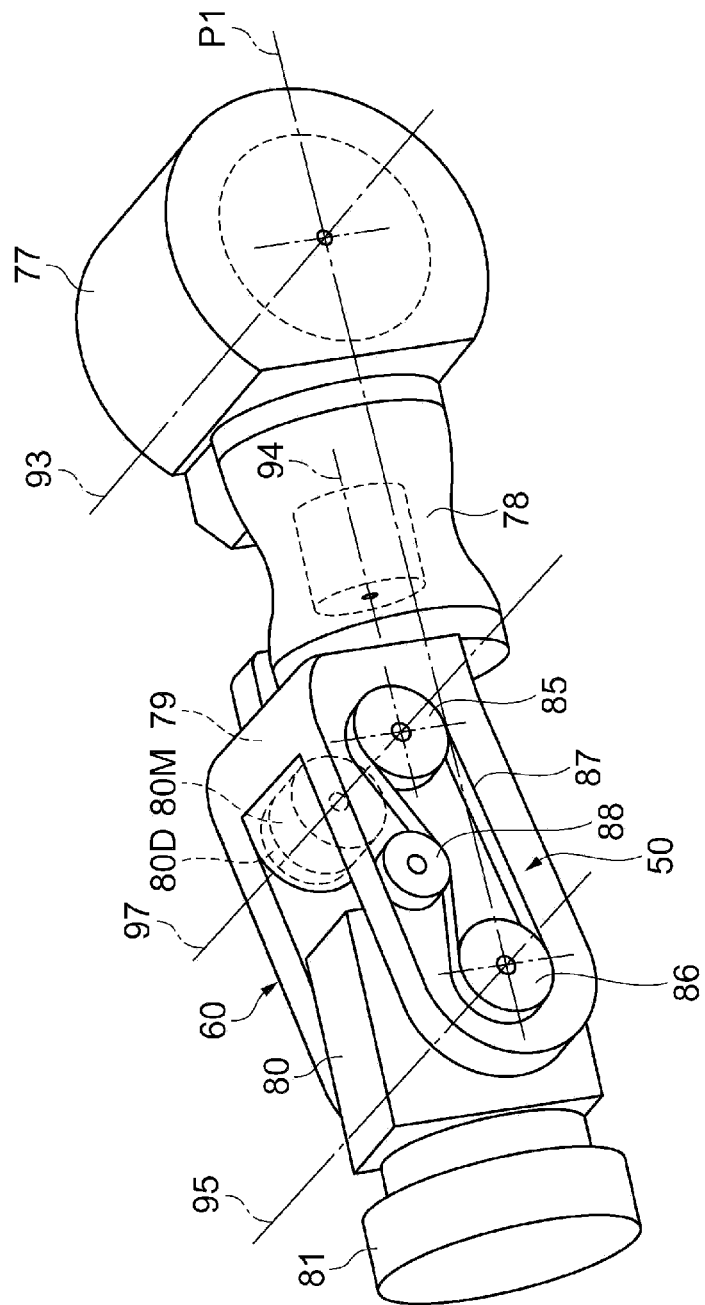
FIG. 22 is a perspective view schematically showing the structure of a driving transmitting section of the robot according to the third embodiment 1.

FIG. 22 is a perspective view schematically showing the structure of the driving transmitting section 350 that flexes the wrist member 380 with respect to the joint 379 of the robot 310. A part of members other than the driving transmitting section 350 is omitted. For convenience of explanation of the structure of the driving transmitting section 350 on the inside of the joint 379, a part of the members is seen through.

In the multi-joint arm of the robot 310 including the plurality of joint driving mechanisms in which the arm members such as the plurality of links and joints are coupled by the twisting turning axes and the flexing turning axes, the driving transmitting section 350 functioning as the joint driving mechanism including the third flexing turning axis 395, which is the flexing turning axis on the most end side, as the turning axis is set in the joint 379 (see FIG. 20). More specifically, the driving transmitting section 350 is arranged on one side surface of side surfaces in a direction substantially orthogonal to the third flexing turning axis 395 of the joint 379. Note that, in this embodiment, "substantially orthogonal" has a meaning including crossing in a range within 10° in addition to completely orthogonal.

In FIG. 22 showing details of the driving transmitting section 350 including the third flexing turning axis 395, the joint 379 includes a driven pulley 386 functioning as a driven wheel that turns with the third flexing turning axis 395 as a turning axis, a motor 380M functioning as a driving turning source for the third flexing turning axis 395, a driving shaft 397 which turns around a turning axis same as the third flexing turning axis 395 by the motor 380M, and a driving pulley 385 functioning as a driving wheel turned by the motor 380M via the driving shaft 397. A number-of-turns detecting section (a position detector) 380D is provided near the motor 380M. However, a position where the number-of-turns detecting section (a position detector) 380D is provided may be a position other than the position shown in the figure. As the number-of-turns detecting section 380D, a unit structure may be used or a module structure may be used.

The driving pulley 385 and the driven pulley 386 are coupled via a timing belt 387 functioning as an endless power transmission cable. Between the driving pulley 385 and the driven pulley 386, an idler 388 including a pulley turnably set in contact with the timing belt 387 according to the movement of the timing belt 387 in order to adjust tension of the timing belt 387 is arranged.

The robot 310 having the configuration explained above is not limited to an industrial robot and may be a medical robot and a robot for home use.

With the driving transmitting section 350 set in the joint 379, a reduction in the size of the joint 379 functioning as the arm member, in which the third flexing turning axis 395 is set, can be further attained than a structure in which a motor functioning as a driving turning source is directly connected to the third flexing turning axis 395 as well.

Specifically, an increase in the width of the joint 379 in the arm width direction orthogonal to the extending direction of the multi-joint arm due to the arrangement of the motor in the axis direction of the third flexing turning axis 395 is suppressed.

Details of the structure of the wrist member, which is a main part of the robot in this embodiment, are explained.

Figure 23:
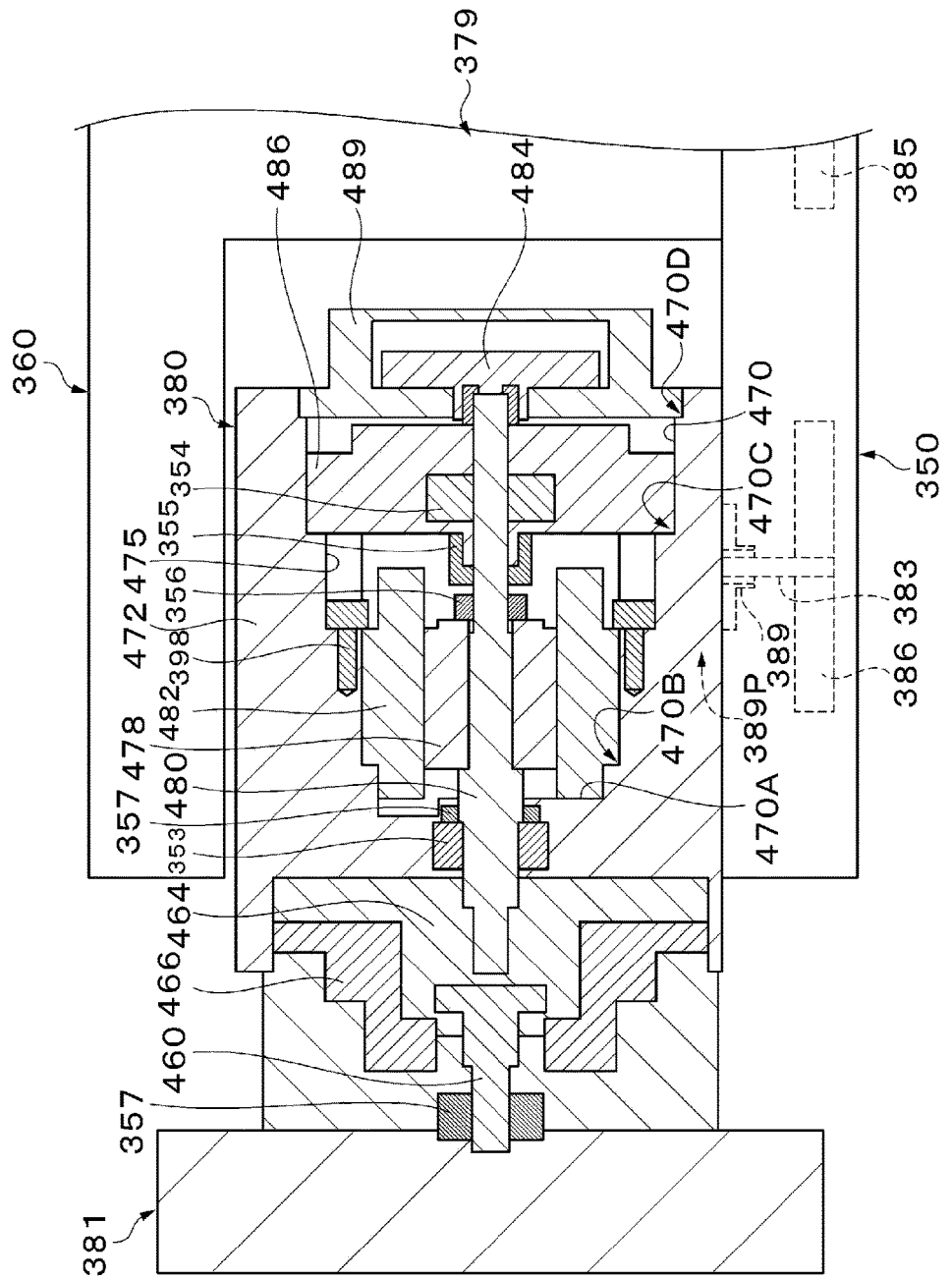
FIG. 23 is a partial sectional view schematically showing the structure of a joint driving mechanism of a wrist member of the robot according to the third embodiment 1.
Figure 24:
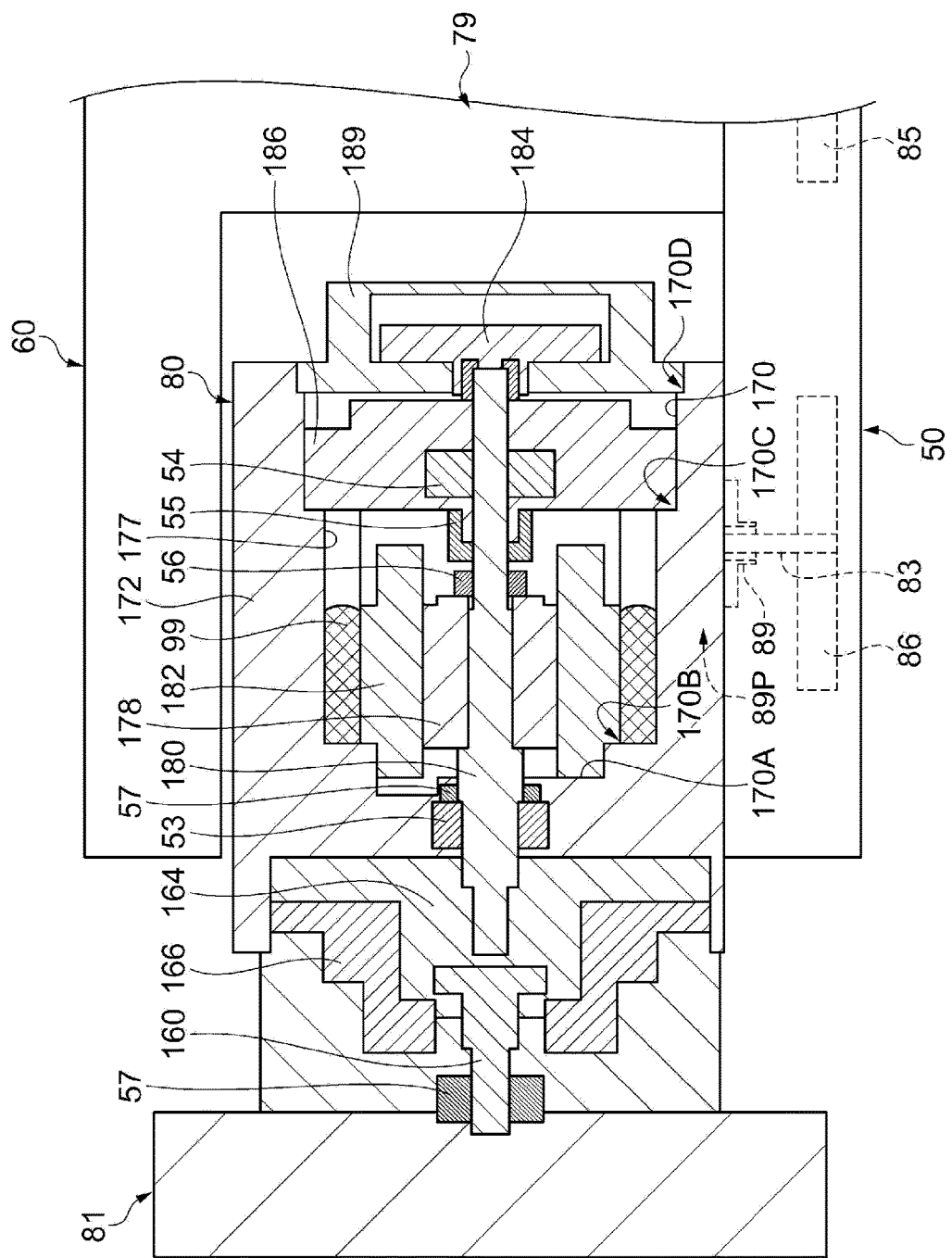
FIG. 24 is a partial sectional view of a cross section, which is different from FIG. 23, schematically showing the structure of the joint driving mechanism of the wrist member of the robot according to the third embodiment 1.

FIG. 23 is a partial sectional view schematically showing the structure of the joint driving mechanism of the wrist member 380 of the robot 310 in the embodiment. FIG. 24 is a partial sectional view for explaining, in a cross section different from FIG. 23, the joint driving mechanism of the wrist member 380.

In FIG. 23, the wrist member 380 includes a bearing section 389P. The other end of a shaft 383, one end of which is attached to the driven pulley 386 of the driving transmitting section 350 of the joint 379, is attached to the bearing section 389P. Consequently, the wrist member 380 is cantilevered via the shaft 383 and a bearing 389 in the bearing section 389P on the driving transmitting section 350 side of the joint 379. With this configuration, the width in a flexing turning axis direction (in the figure, the third flexing turning axis 395 direction) of the wrist section (the wrist member 380) of the robot 310 can be made compact. This is advantageous for a reduction in the size of the robot 310. In this embodiment, in a space on the opposite side across the wrist member 380 of the driving transmitting section 350 of the joint 379, an electric section 360 provided with, for example, a relay board (not shown in the figure) for sending, via an electric wire, driving power and an electric signal to a driving system such as the band 381 and an end effector mounted on the band 381 is arranged.

In the wrist member 380, a motor including at least a rotor 478, a rotor shaft 480, and a stator 482, a reduction gear 464, and a reduction gear output shaft 460 are housed, in a positioned state, in a motor housing recess 470 provided in a housing 472, which is a motor frame of the motor.

In the motor housing recess 470 provided in the housing 472, with the hand 381 side set as a recess bottom section 470A of the motor housing recess 470, a first step section 470B, a second step section 470C, and a third step section 470D widening in order from the hand 381 side to the main body section 371 side (the base side) are formed.

The rotor shaft 480 of the motor is connected to an input shaft of the reduction gear 464 on the inside of the reduction gear 464 and connected to a bearing 353 arranged in the hosing 472. The rotor 478 is provided in the outer circumference of the rotor shaft 480. The stator 482 is provided in the outer circumference of the rotor 478. The motor including the rotor shaft 480, the rotor 478, and the stator 482 is positioned by the recess bottom section 470A and the first step section 470B of the motor housing recess 470 of the housing 472. The motor is turnably held by a screw head of a screw 398 screwed into a screw hole 475 and a coupling pin provided in the rotor shaft 480.

A turning force of the rotor shaft 480 is transmitted to the reduction gear 464. The reduction gear 464 outputs a torque output obtained by increasing the torque of the turning force.

A frame 466 of the reduction gear 464 is connected to the housing 472, which is the motor frame of the motor. The reduction gear 464 decelerates rotation from the motor, increases a torque output of the rotation, and outputs the torque output. The reduction gear 464 incorporates a gear mechanism (not shown in the figure) that decelerates a turn of an input shaft and a joint bearing mechanism (not shown in the figure) that supports the reduction gear output shaft 460. The reduction gear output shaft 460 is connected to a bearing 357 arranged in the hand 381.

Besides, in the wrist member 380, a mechanical brake 486 connected to the rotor shaft 480 via a bearing 354 and a coupling nut 355 and a number-of-turns detecting section (a position detector) 484 are provided. However, positions where the mechanical brake 486 and the number-of-turns detecting section 484 are provided may be positions other than the positions shown in the figure. In this embodiment, the mechanical brake 486 is housed in the motor housing recess 470 of the housing 472 while being positioned by the second step section 470C. The number-of-turns detecting section 484 is connected to the rotor shaft 480 in a space in a lid section 489 of the motor housing recess 470 provided while being positioned by the third step section 470D of the motor housing recess 470 of the housing 472. Note that, as the number-of-turns detecting section 484, a unit structure may be used or a module structure may be used.

FIG. 24 is a partial sectional view of the structure of a node driving mechanism of the wrist member 380 viewed on a cross section different from FIG. 23. Specifically, FIG. 24 is a diagram for explaining a cross section different from a portion where the screw hole 475 for holding the motor with the screw 398 is formed.

In FIG. 24, on a sidewall of the motor housing recess 470 in which the motor including the rotor shaft 480, the rotor 478, and the stator 482 is held in the positioned state, a heat radiation groove section 477 recessed toward the outer side of the housing 472 is formed. A heat radiation member 399 having a relatively high thermal conductivity is filled and solidified between the heat radiation groove section 477 and the stator 482 of the motor.

As the heat radiation member 399 filled between the heat radiation groove section 477 and the stator 482, metal paste is preferable and, in particular, silver paste is suitable. Since the silver paste has high thermal conductivity, a heat radiation effect can be improved. Further, since the silver paste is a metal paste material widely used in the past, the silver paste is excellent in workability. Therefore, it is possible to improve manufacturing efficiency.

With the robot 310 including the wrist member 380 in this embodiment, it is possible to provide the wrist member 380 further reduced in size than a configuration in which a motor positioned and housed in a housing is further housed in a member forming the outer shape of a wrist member as in the past.

Moreover, the heat radiation groove section 477 is provided on the sidewall around the motor (the stator 482) of the motor housing recess 470 of the housing 472. The heat radiation member 399 such as the silver paste is filled and solidified in a gap between the heat radiation groove section 477 and the motor. Therefore, it is possible to radiate, with the heat radiation member 399, heat generated by the driving of the motor.

Therefore, heat generation of the wrist member 380 is suppressed. A mechanical deficiency of a driving element for the wrist member 380 arranged in the housing 472 due to heat can be reduced. Therefore, it is possible to provide the small and light robot 310 capable of highly accurately executing a variety of kinds of fine work.

A manufacturing method for the robot in the embodiment, in particular, a manufacturing method for the wrist member 380 is explained.

Figure 25:
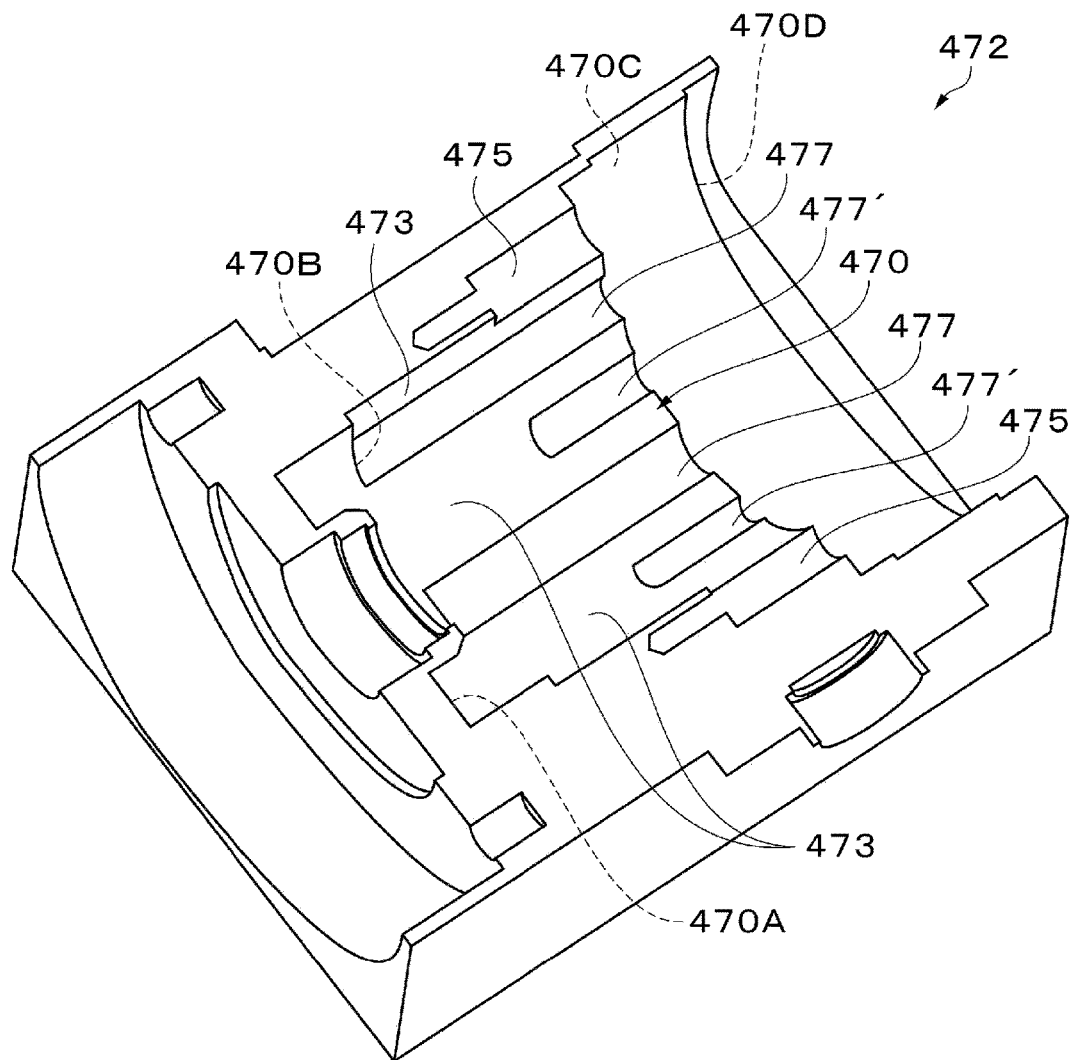
FIG. 25 is a perspective sectional view schematically showing the shape of the inside of a housing of the wrist member in the third embodiment 1 cut into substantially a half.

FIG. 25 is a perspective sectional view schematically showing the shape of the inside of the housing 472 of the wrist member 380 in the embodiment cut into substantially a half.

Figure 26:
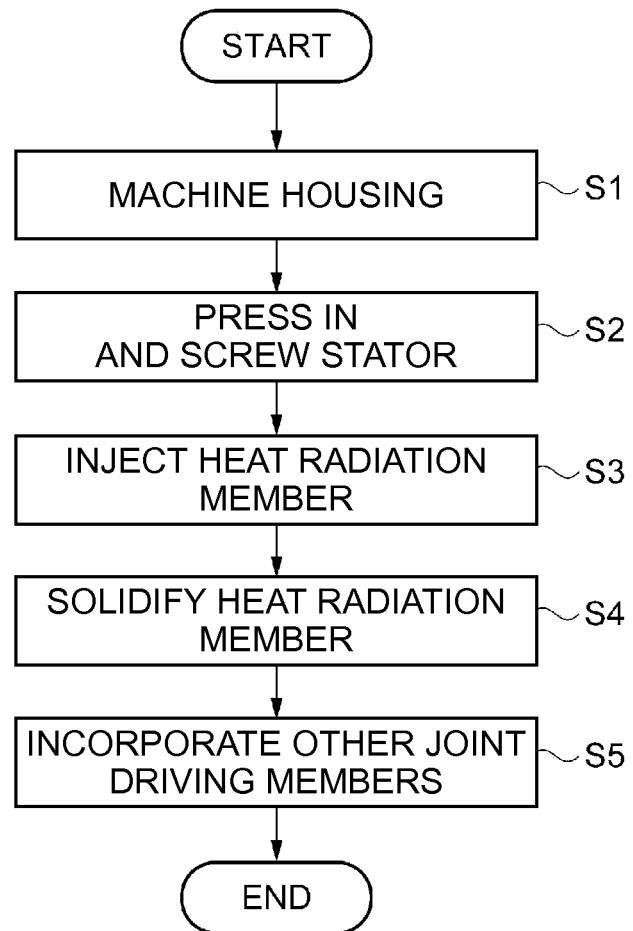
FIG. 26 is a flowchart showing a manufacturing method for the robot according to the third embodiment 1.

FIG. 26 is a flowchart for explaining the manufacturing method for the robot (the wrist member 380) in the embodiment.

In the manufacturing method for the wrist member 380 in this embodiment shown in FIG. 25, first, in step S1, by applying cutting or the like to a forming member of the housing 472, the motor housing recess 470, the screw hole 475, and the heat radiation groove section 477 are formed together with the external shape of the housing 472. In this way, the formation of the housing 472, in particular, the motor housing recess 470, the screw hole 475, and the heat radiation groove section 477 can be performed by the same machine tool and in the same process. Therefore, efficiency is high.

When a plurality of heat radiation groove sections 477 are formed, all the shapes of the heat radiation groove sections 477 do not need to be set the same. For example, as shown in FIG. 25, deep heat radiation groove sections 477 and shallow heat radiation groove sections 477' may be formed toward the recessed bottom section 470A side of the motor housing recess 470. Depths from the stator 482 side (see FIGS. 23 and 24) of the heat radiation groove sections 477 and 477' toward the outer side of the housing 472 may also be changed. In any case, the shapes and the sizes of the heat radiation groove sections 477 and 477', other cutouts, and the like are determined in a range in which rigidity resistible against a force of a moment applied to the wrist member 380 is not spoiled when the end effector amounted on the hand 381 connected to the wrist member 380 is moved to cause the end effector to execute predetermined work. For example, a total of the sizes (capacities) of the plurality of heat radiation groove sections 477 and 477' is set targeting 50% to 70% of the capacity of the motor housing recess 470. Consequently, it is possible to secure a heat radiation property, rigidity, workability of press-in of a motor explained below, or the like.

Subsequently, in step S2, the motor including the rotor shaft 480, the rotor 478, and the stator 482 is pressed into the motor housing recess 470 formed in the housing 472. The motor (the stator 482) is positioned by the recess bottom section 470A of the motor housing recess 470 and a positioning section 473 on the side surface of the first step section 470B and fixed to the motor housing recess 470 of the housing 472 by the screw head of the tightened screw 398.

In step S3, the heat radiation member 399 such as the silver paste is injected into between the motor (the stator 482) and the heat radiation groove sections 477 and 477'. The injection of the heat radiation member 399 can be performed by, for example, a method in the past in which a dispenser is used. In this case, for example, entrainment of air bubbles can be suppressed by injecting the heat radiation member 399 after inserting a needle of a dispenser to the vicinity of the bottoms of the heat radiation groove sections 477 and 477' (the recess bottom section 470A side of the motor housing recess 470).

In step S4, the heat radiation member 399 such as the silver paste is solidified. For the solidification of the heat radiation member 399, various methods are adopted according to hardening type of the heat radiation member 399 in use. For example, the heat radiation member 399 of a thermosetting type is put in an oven or the like and subjected to predetermined heating. The heat radiation member 399 of a photocuring type is solidified by irradiating light having a predetermined wavelength such as an ultraviolet ray.

As shown in step S5, the joint driving members other than the motor such as the reduction gear and the mechanical brake are incorporated in the housing 472. A series of the manufacturing method for the wrist member 380 is ended.

With the manufacturing method for the wrist member 380 of the robot 310 according to this embodiment explained above, with a relatively simple process in which well-known cutting or the like is used, it is possible to manufacture and provide the wrist member 380 further reduced in size compared with a configuration in which a motor positioned and housed in a housing is further housed in a member forming the external shape of a wrist member as in the past.

Moreover, in this application example, heat generated by the driving of the motor can be radiated by the heat radiation groove sections 477 and 477' formed around the motor and the heat radiation member 399 filled in the heat radiation groove sections 477 and 477'. Therefore, heat generation of the wrist member 380 is further suppressed than when heat is directly transferred to the wrist member 380. It is possible to reduce a mechanical deficiency of a driving element for the wrist member 380 arranged in the housing 472 due to heat.

Third Embodiment 2

A robot according to this embodiment is explained with reference to the drawings.

Figure 27:
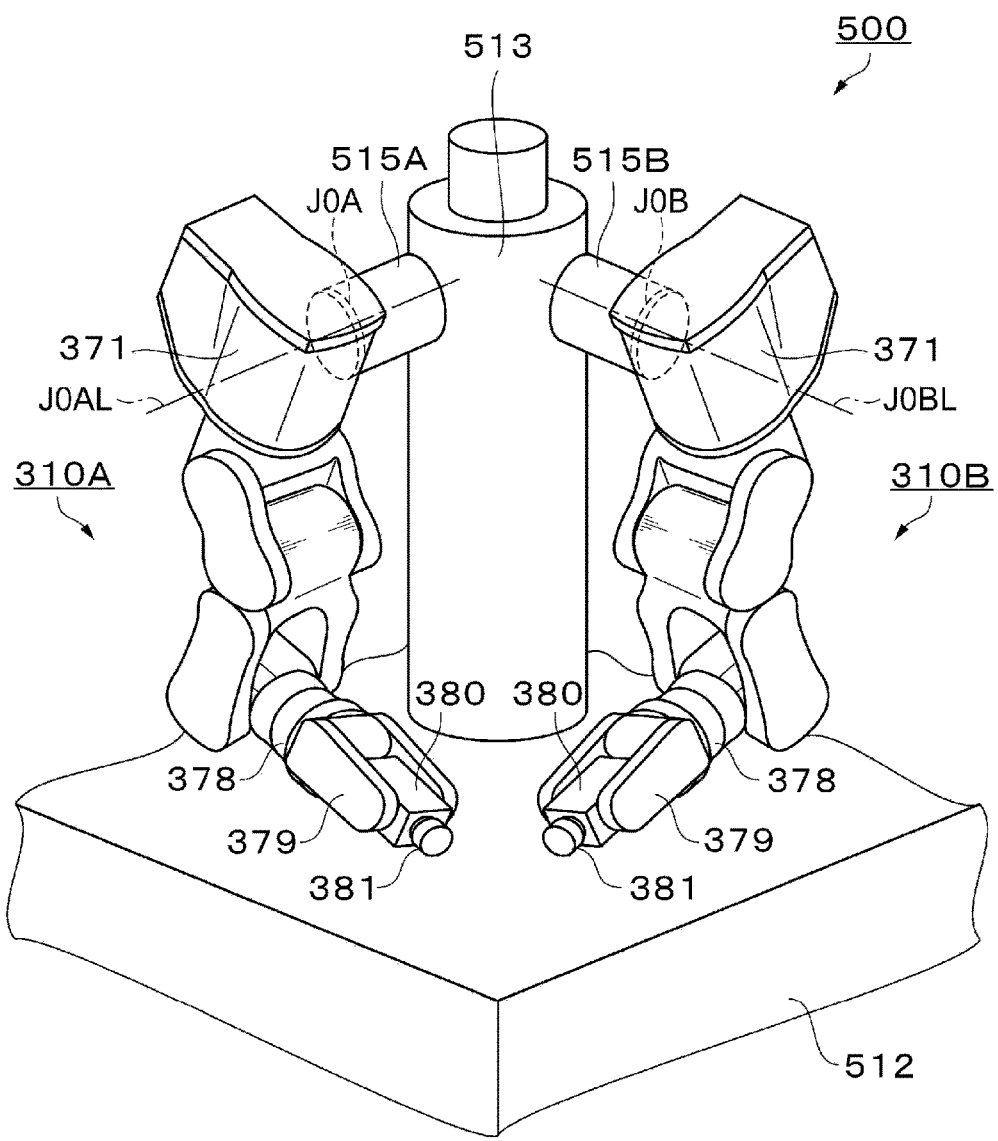
FIG. 27 is an explanatory diagram schematically showing a robot according to a third embodiment 2.

FIG. 27 is an explanatory diagram schematically showing the robot according to this embodiment. Note that components same as the components in the third embodiment 1 are denoted by the same reference numerals and signs and redundant explanation of the components is omitted.

In FIG. 27, a robot 500 according to this embodiment is a double-arm robot in which a first robot arm 310A and a second robot arm 310B, which are configured the same as the robot arm of the robot 310 in the third embodiment 1, are set in a body section 513.

The robot 500 includes a stand 512 that supports the robot 500, a columnar body section 513 fixed to the stand 512, and a first arm coupling section 515A and a second arm coupling section 515B projected at a substantially right angle from the body section 513 to an upper part on the opposite side of the stand 512 side of the body section 513.

A first robot arm 310A setting surface side on the opposite side of the body section 513 side of the first arm coupling section 515A includes a first arm fixing section JOA turnable around a 0-th turning axis JOAL that pierces through the first arm coupling section 515A in the projecting direction of the first arm coupling section 515A. The main body section 371 of the first robot arm 310A configured the same as the robot arm of the robot 310 in the third embodiment 1 is fixed to the first arm fixing section JOA.

Similarly, a second robot arm 310B setting surface side on the opposite side of the body section 513 side of the second arm coupling section 515B includes a second arm fixing section JOB turnable around a 0-th turning axis JOBL that pierces through the second arm coupling section 515B in the projecting direction of the second arm coupling section 515B. The main body section 371 of the second robot arm 310B configured the same as the robot arm of the robot 310 in the third embodiment 1 is fixed to the second arm fixing section JOB.

In both of the first robot arm 310A and the second robot arm 310B for six-axis control, the first arm fixing section JOA and the second arm fixing section JOB respectively include the 0-th turning axis JOAL and the 0-th turning axis JOBL. Therefore, the robot 500 substantially for seven-axis control can realize movement with a high degree of freedom on a variety of tracks of the first robot arm 310A and the second robot arm 310B.

The robot 500 according to this embodiment includes the first robot arm 310A and the second robot arm 310B configured the same as the robot arm of the robot 310 explained in the third embodiment 1. Therefore, it is possible to provide the small double-arm robot 500 capable of highly accurately performing a variety of kinds of fine work.

Note that the invention is not limited to the embodiments explained above. Various changes, improvements, and the like can be applied to the embodiments. Modifications are explained below.

For example, in the embodiments, it is explained that the metal paste such as the silver paste is suitable as the heat radiation member 399. However, besides the metal paste, various members can be used as the heat radiation member 399.

For example, as a fluid like the metal past, for example, a silicon oil-based heat conductive fleece dispersed with carbon, aluminum, or the like can be used.

As a solid, a graphite sheet, thermosetting silicon rubber, or relatively soft metal such as indium can be used.

The shape of the heat radiation groove sections 477 and 477' is not limited to the shape shown in the figure in the third embodiment 1. For example, by forming fine unevenness on the heat radiation groove sections 477 and 477', the surface area of the heat radiation groove sections 477 and 477' increases, the heat radiation property is improved, and adhesion of the heat radiation member 399 can be improved.

The robot 500 in the third embodiment 2 is explained as the double-arm robot including the first robot arm 310A and the second robot arm 310B. However, the robot 500 is not limited to this and may include three or more robot arms.

Application Example 9-1

A manufacturing method for a robot according to this application example is a manufacturing method for a robot including a base, a multi-joint arm provided in the base, a wrist member coupled to the multi-joint arm, and a hand mounted with an end effector turnably coupled to the wrist member. The wrist member includes a motor including a rotor, a rotor shaft, and a stator and a housing including a motor housing recess, in which the motor is positioned and housed, and forming an external shape of the wrist member. The manufacturing method includes: forming a motor incorporating recess including a positioning section for the stator, a screw hole for a screw for fixing the stator incorporated in the motor incorporating recess, and a heat radiation groove section recessed from a sidewall of the motor incorporating recess toward the outer side of the housing; positioning the stator in the positioning section of the motor incorporating recess and then fixing the stator with the screw; injecting a heat radiation member having fluidity in a normal state and high thermal conductivity into a gap between the stator and the heat radiation groove section; and solidifying the heat radiation member.

According to this application example, with a relatively simple process in which well-known cutting or the like is used, it is possible to manufacture the wrist member further reduced in size compared with a configuration in which a motor positioned and housed in a housing is further housed in a member forming the external shape of a wrist member as in the past.

Moreover, in this application example, heat generated by the driving of the motor can be radiated by the heat radiation member. Therefore, heat generation of the wrist member is further suppressed than when heat is directly transferred to the wrist member. It is possible to reduce a mechanical deficiency of a driving element for the wrist member arranged in the housing due to heat. For example, when a driving element other than the motor such as a position (turn) detector (encoder) included in the wrist member is also arranged in the housing, it is possible to suppress a deficiency in the driving of the robot that could be caused by a malfunction of the driving element such as the position detector due to heat of the motor.

Therefore, it is possible to provide a small and light robot capable of highly accurately executing a variety of kinds of fine work.

Application Example 9-2

In the manufacturing method for the robot described in the application example 9-1, it is preferable to use metal paste as the heat radiation member.

For example, since silver paste has high thermal conductivity, a heat radiation effect can be improved. Further, since the silver paste is a material widely used in the past, the silver paste is excellent in workability of application or the like by a dispenser and is easily manufactured. Therefore, the silver paste is suitable as a heat radiation material.

Application Example 9-3

A robot according to this application example is a robot including: a base, a multi-joint arm provided in the base; and a wrist member configuring a part of the multi-joint arm. The wrist member includes: a motor including a rotor, a rotor shaft, and a stator; and a housing including a motor housing recess, in which the motor is positioned and housed, and forming the external shape of the wrist member. In the housing, a motor incorporating recess including a positioning section for the stator, a hole section for fixing the stator incorporated in the motor incorporating recess, and a heat radiation groove section on a sidewall of the motor incorporating recess are formed. A heat radiation member is filled in the heat radiation groove section.

According to this application example, it is possible to manufacture the wrist member further reduced in size compared with a configuration in which a motor positioned and housed in a housing is further housed in a member forming the external shape of a wrist member as in the past. Heat generated by the driving of the motor can be radiated by the heat radiation member. Therefore, heat generation of the wrist member is suppressed. It is possible to reduce a mechanical deficiency of a driving element for the wrist member arranged in the housing due to heat.

Therefore, it is possible to provide a small and light robot capable of highly accurately executing a variety of kinds of fine work.

Application Example 9-4

In the robot described in the application example 9-3, it is preferable that metal paste is filled and solidified in the heat radiation member.

According to this application example, since silver paste has high thermal conductivity, a heat radiation effect can be improved. Further, since the silver paste is a material widely used in the past, the silver paste is excellent in workability. Therefore, it is possible to provide, at low costs, a small and light robot capable of highly accurately executing a variety of kinds of fine work.

Application Example 9-5

In the robot described in the application example 9-3, a plurality of the multi-joint arms are provided in the base.

According to this application example, the robot includes a plurality of the small and light multi-joint arms described in the application example 9-3 in which a movable area is secured large and a singular point is suppressed and that includes a heat radiation structure for heat due to the driving of the motor. Therefore, it is possible to provide a small robot capable of highly accurately executing a variety of kinds of fine work.

Application Example 10-1

A robot arm according to this application example is a robot arm in which a plurality of arm sections are turnably connected. The arm section includes a plurality of links and an actuator section that turns the links. The actuator section includes: a cylindrical cover provided on the outer surface; a motor that turns the link; a motor frame included in the motor; a reduction gear that decelerates rotation from the motor and outputs a torque output; a collar fixed to the reduction gear; and a wire body including at least one of a wire and a pipe. At least apart of the wire body is housed between a surface including a first small body section formed by the motor frame and the collar and a surface including a second small body section of the cylindrical cover.

Consequently, the wire body can be wound and set. Therefore, it is possible to reduce the length of the wire body as much as possible. Consequently, it is possible to reduce costs of the wire body itself. When the wire body is drawn around, it is possible to quickly and easily perform drawing-around work (wiring work) for the wire body.

Application Example 10-2

In the robot arm described in the application example 10-1, it is preferable that the first small body section formed by the motor frame and the collar is a constricted surface and the second small body section of the cylindrical cover is a constricted surface.

Consequently, an inner tube side reduced diameter section and an outer tube reduced diameter section are portions where steep unevenness is suppressed. Therefore, it is possible to prevent a cable between the reduced diameter sections from being damaged by the unevenness.

Application Example 10-3

In the robot arm described in the application example 10-1, it is preferable that at least a part of the wire body is wound around a longitudinal axis of the arm section.

Consequently, the wire body is wound and set. Therefore, it is possible to reduce the length of the wire body.

Application Example 10-4

In the robot arm described in the application example 10-1, it is preferable that the wire body is curved in a U shape and housed.

Consequently, an unintended kink of the wire body is prevented. Therefore, the life of the wire body can be secured long.

Application Example 10-5

In the robot arm described in the application example 10-1, it is preferable that the cylindrical cover is configured by two members in the longitudinal axis direction of the arm section and the two members are turnable around the longitudinal axis of the arm section.

Consequently, the cylindrical cover is twisted around the center axis of the cylindrical cover.

Application Example 10-6

A robot according to this application example includes the robot arm described in the application example 10-1.

Consequently, the wire body can be wound and set. Therefore, it is possible to reduce the length of the wire body as much as possible. Consequently, it is possible to reduce costs of the wire body itself. When the wire body is drawn around, it is possible to quickly and easily perform drawing-around work (wiring work) for the wire body.

Application Example 11-1

A robot arm according to this application example is a robot arm in which a plurality of arm sections are turnably connected. The arm section includes: a cylindrical cover provided on the outer circumferential surface; a motor; a motor frame included in the motor; a reduction gear that decelerates rotation from the motor and outputs a torque output; an encoder that detects a rotation angle of the motor; a wire body including at least one of a wire and a pipe; and a housing space in which at least a part of the wire body is housed between the motor frame and the cylindrical cover. The thickness of the motor frame increases further away from the reduction gear toward the encoder.

Consequently, for example, heat generated from the motor when the motor operates is surely transferred from a portion having a relatively large heat capacity and increased in thickness of the motor frame toward the proximal end side. The heat transferred toward the proximal end side is gradually radiated during the transfer. Consequently, it is possible to surely prevent the motor from being excessively heated.

Application Example 11-2

In the robot arm described in application example 11-1, it is preferable that the outer diameter of the motor frame increases according to the thickness of the motor frame.

Consequently, it is possible to surely transfer the heat generated from the motor to a base side.

Application Example 11-3

In the robot arm described in the application example 11-1, it is preferable that, in the cylindrical cover of the arm section, a small body section with reduced length of a body circumference is provided in a position where the thickness is large in the longitudinal direction of the arm section.

Consequently, it is possible to secure a turning angle of the arm section as wide as possible.

Application Example 11-4

A robot according to this application example includes the robot arm described in the application example 11-1.

Consequently, for example, heat generated from the motor when the motor operates is surely transferred from a portion having a relatively large heat capacity and increased in thickness of the motor frame toward the proximal end side. The heat transferred toward the proximal end side is gradually radiated during the transfer. Consequently, it is possible to surely prevent the motor from being excessively heated.

The robot arm and the robot being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A robot arm comprising:
    a plurality of arms that are turnably connected, wherein the plurality of arms include a plurality of links and an actuator that turns the plurality of links,
    the actuator includes:
        an outer cover provided on an outer surface of the actuator;
        a motor that turns the plurality of links;
        a motor frame that supports the motor;
        a reduction gear that decelerates rotation from the motor and outputs a torque;
        a collar fixed to the reduction gear; and
        a wiring member including at least one of a wire and a pipe,
    at least a part of wiring member is housed between a surface including a first body section formed by the motor frame and the collar and a surface including a second body section of the outer cover, and
    the first body section and the second body section are hourglass-shaped.

2. The robot arm according to claim 1, wherein at least a part of the wiring member is wound around a longitudinal axis of one of the plurality of arms.

3. The robot arm according to claim 1, wherein the wiring member is curved in a U shape.

4. The robot arm according to claim 1, wherein the outer cover is configured by two members in a longitudinal axis direction of one of the plurality of arms, and
    the two members are turnable around the longitudinal axis of the one of the plurality of arms.

5. A robot comprising the robot arm according to claim 1.

* * * * *